United States Patent
Achten et al.

(10) Patent No.: US 8,211,979 B2
(45) Date of Patent: Jul. 3, 2012

(54) RUBBER AND THERMOPLASTIC MULTI-COMPONENT SYSTEMS, RUBBER AND THERMOPLASTIC COMPOSITE MOULDED PIECES MADE THEREFROM, METHOD FOR PRODUCTION AND USE THEREOF

(75) Inventors: Dirk Achten, Köln (DE); Stefanie Nickel, Willich (DE); Maik Schulte, Dormagen (DE); Michael Münker, Bergisch Gladbach (DE); Detlev Joachimi, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 544 days.

(21) Appl. No.: 12/086,679

(22) PCT Filed: Dec. 15, 2006

(86) PCT No.: PCT/EP2006/012099
§ 371 (c)(1),
(2), (4) Date: Oct. 17, 2008

(87) PCT Pub. No.: WO2007/079903
PCT Pub. Date: Jul. 19, 2007

(65) Prior Publication Data
US 2009/0099317 A1   Apr. 16, 2009

(30) Foreign Application Priority Data
Dec. 22, 2005   (DE) .................. 10 2005 062 075

(51) Int. Cl.
*C08L 9/00* (2006.01)
*C08L 33/00* (2006.01)
*C08L 35/00* (2006.01)
*C08L 67/00* (2006.01)
*C08L 77/00* (2006.01)

(52) U.S. Cl. ........ 525/132; 525/133; 525/146; 525/150; 525/151; 525/165; 525/166; 525/175; 525/176; 525/177; 525/178; 525/179; 525/180; 525/183; 525/184; 525/185; 525/189; 525/194; 525/221; 525/222; 525/230; 525/232; 525/233; 525/238; 525/387

(58) Field of Classification Search .................. None
See application file for complete search history.

(56) References Cited

U.S. PATENT DOCUMENTS

| 4,107,134 A | 8/1978 | Dawans .................. 260/42.17 |
| 4,826,721 A | 5/1989 | Obrecht et al. ............... 428/252 |
| 5,132,182 A | 7/1992 | Grosse-Puppendahl et al. .................... 428/475.8 |
| 5,141,816 A | 8/1992 | Walker et al. ................ 428/420 |
| 5,150,465 A | 9/1992 | Bush et al. |
| 5,484,848 A | 1/1996 | Jadamus et al. .............. 525/105 |
| 6,162,385 A | 12/2000 | Grosse-Puppendahl et al. .................... 264/250 |
| 2002/0142166 A1 | 10/2002 | Suzuki et al. ............. 428/411.1 |
| 2003/0029169 A1 | 2/2003 | Hanna et al. .................. 60/651 |
| 2003/0170469 A1 | 9/2003 | Ikuta et al. .................... 428/477 |
| 2005/0156352 A1 | 7/2005 | Burkle et al. ................. 264/257 |
| 2007/0208136 A1* | 9/2007 | Nasreddine et al. .......... 525/178 |

FOREIGN PATENT DOCUMENTS

| DE | 1 696 252 | 1/1972 |
| DE | 25 23 758 | 1/1976 |
| DE | 195 40 333 | 4/1997 |
| DE | 199 14 162 | 10/2000 |
| EP | 0 244 090 | 11/1987 |
| EP | 0383498 | 3/1993 |
| EP | 1 044 224 | 6/2003 |
| GB | 1 305 893 | 2/1973 |
| WO | 03/000492 A1 | 1/2003 |
| WO | 03/020820 | 3/2003 |
| WO | 2005/067562 | 7/2005 |

OTHER PUBLICATIONS

International Search Report in co-pending International Application PCT/EP2006/012099 mailed Apr. 2, 2007, 3 pages.
Houben-Weyl Methoden der Organischen Chemie (Methods of Organic Chemistry) vol. 14/1 Georg Thieme Verlag Stuttgart 1961—Complete Book, Not Submitted.
SGF Rubber Handbook of the Swedish Institute for Rubber Technology, 10th edition Complete Book, Not Submitted.

* cited by examiner

*Primary Examiner* — Ana Woodward
(74) *Attorney, Agent, or Firm* — Jennifer R. Seng

(57) ABSTRACT

A multicomponent system is provided, composed of a thermoplastic component and of a rubber component, which comprises at least two different peroxidic crosslinking agents with specific decomposition temperatures, as also is a process for production of rubber-thermoplastic composite mouldings using the multicomponent system, and also the resultant rubber-thermoplastic composite mouldings.

15 Claims, 2 Drawing Sheets

Figure 1: Thermoplastics-rubber composite moulding from Example I
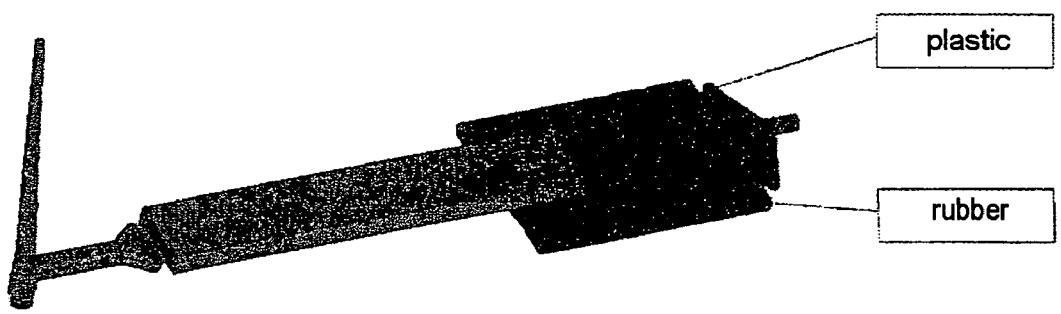

Figure 2: Thermoplastics-rubber composite moulding from Example II
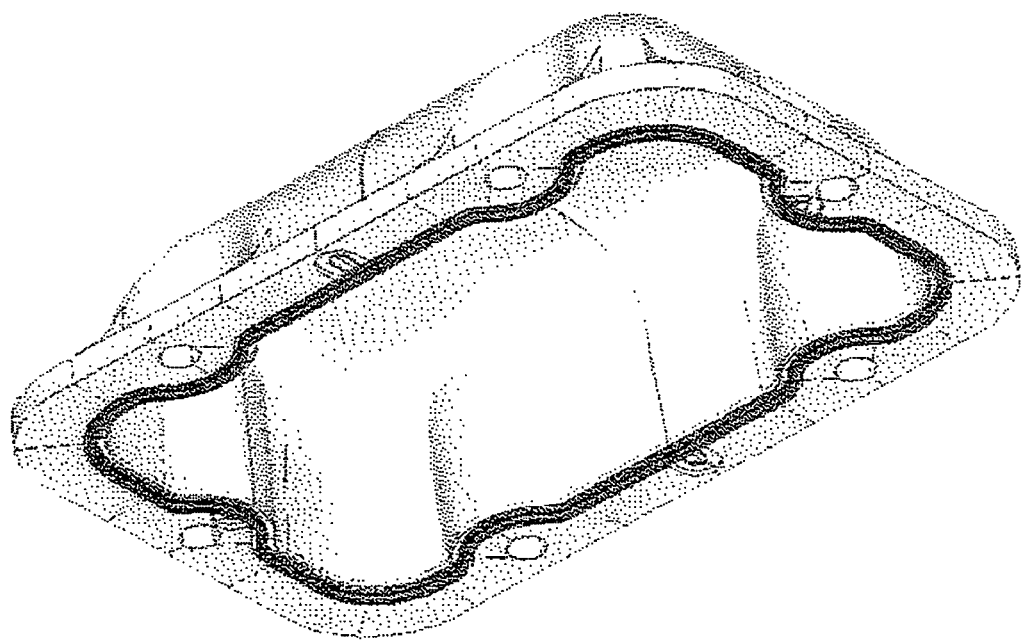

RUBBER AND THERMOPLASTIC MULTI-COMPONENT SYSTEMS, RUBBER AND THERMOPLASTIC COMPOSITE MOULDED PIECES MADE THEREFROM, METHOD FOR PRODUCTION AND USE THEREOF

The invention relates to a multicomponent system composed of a thermoplastic component and of a rubber component, which comprises at least two different peroxidic crosslinking agents with specific decomposition temperatures, and also to a process for production of rubber-thermoplastic composite mouldings using the multicomponent system, and also the resultant rubber-thermoplastic composite mouldings.

Because there are different temperature ranges for the processing of thermoplastics components and, respectively, rubber components, processes for production of rubber-plastics composite articles are often attended by difficulties with respect to temperature profile and dimensional stability of the thermoplastic, and there are problems in manufacturing mouldings of this type in one mould system and in a fully automated process.

There is a long history of use of adhesive bonding, screwing, riveting, mechanical interlocking or use of an adhesion promoter for assembly of composite materials composed of stiff thermoplastic sections and of elastomeric sections.

The processes involved here usually have three stages, in which each of the two mouldings is separately produced in two separate steps and they are manually combined in a third step. If necessary, a further stage is used for their adhesive-bonding. These processes are correspondingly expensive and a relatively high proportion of reject product is often observed. Furthermore, very high costs have to be met for control of the position of the gasket.

In two-stage processes, the thermoplastic is first injection moulded in the first stage, and if required is provided with adhesion promoters, and then the elastomer component is vulcanized onto the material in a second step of the process. In this method, too, a disadvantage is the high cost of equipment, and also a considerable amount of operator time is required for production of the products.

Recently, novel processes have been developed for production of composite articles based firstly on a thermoplastic and secondly on a vulcanizate.

In particular, there are various known processes and combinations of materials for production of rubber-plastics composite articles, these being suitable for high-temperature-resistant and oil-resistant mouldings with sealing and damping functions.

EP-A-0 344 427 discloses that specialized rubbers can be used for production of composite articles composed of polyamides and of rubber vulcanizates. The character of these rubbers, i.e. their functionalization with carboxy groups or with anhydride groups, is essential for successful production of the composite articles by the said process. At the same time, the polyamides used have to have more amino groups than carboxy groups. No importance is attributed to the other conditions of the process, including, for example, the nature of the rubber vulcanization process. The vulcanization process is carried out with use of a single peroxide. A disadvantage of the said process is that specialized rubbers of this type are usually markedly more expensive than standard rubbers and also that the properties of the said specialized rubbers differ from those of standard rubbers.

EP-A-0 629 653 describes a process for production of composite articles composed of at least two sections composed of vulcanizates and of polyamides, securely bonded to one another, where the vulcanizate is produced from a rubber mixture under the conventional vulcanization conditions in contact with the polyamide moulding, and the said rubber mixture essentially comprises a peroxidic crosslinking system and at the same time a silane containing a double bond. No importance is attributed to the nature of the peroxidic crosslinking agent. In each case, a single peroxide is used. Although the adhesion values achieved are good, the process is attended by some disadvantages. For example, at a relatively high concentration of reactive groups in the rubber mixture there is the possibility of undesired adhesion to the metal mould usually used during the vulcanization process. For certain applications it is moreover, extremely disadvantageous that the resistance of the elastomers used towards oils, greases, solvents and fuels, e.g. super-grade petrol, or diesel or alcohol-containing fuels, is unsatisfactory in particular at relatively high temperatures.

DE 197 18 504 A1 discloses a process for production of a firmly bonded composite of a hard thermoplastic section based on a polyamide with a soft section composed of a vulcanized fluoroelastomer. The core of the said invention is the use of a fluoroelastomer. The thermoplastic used can comprise a polyamide, a polyamide moulding composition or a polyamide blend. The composite is produced under conventional vulcanization conditions via contact of the fluororubber mixture with the polyamide moulding. No importance is attributed to the nature of the vulcanization process. A disadvantage of the said process is that typical cycle times for vulcanization of the rubber markedly greater than the cycle times of straight thermoplastics injection moulding have to be selected for this process when practised as a one-stage or two-stage operation, the result being impairment of the cost-effectiveness of the process.

DE 199 14 162 A1 discloses composite articles composed of polyester and silicone rubber. The said composite articles are produced by bringing a rubber composition based on a silicone rubber into contact under conventional vulcanization conditions with the hard, thermoplastic polyester component, and optionally the hard thermoplastic component and/or the soft rubber component here also comprises from 0.25 to 12 parts by weight of a bi- or polyfunctional maleimide. No importance is attributed to the nature of the crosslinking process.

In each case a single peroxide is used. The presence of the maleimide is essential for production of a firmly bonded composite of the components. The composite article can, inter alia, be produced via single-stage extrusion, via coextrusion of thermoplastic and rubber composition, and can then be vulcanized. A single-stage injection-moulding process can also be used. A disadvantage of the said process is that composites thus obtained have only limited oil resistance, a particular cause of this being the use of the silicone rubber.

DE 195 40 333 A1 discloses an adhesion-promoter-free bond by a thermoplastic, preferably a polyester, to a rubber, preferably a silicone rubber. Here, the section of the hard thermoplastic component is treated by a corona method in the region intended for bonding to the silicone rubber. However, this implies an inconvenient pretreatment step, the result of this being that the plastics part first has to be removed from the mould, then corona treated and then replaced in the mould system.

DE 102 27 636 A1 moreover discloses a process for production of multicomponent plastics mouldings. In this process, an in-mould compounder is used for production of at least one component of the multicomponent plastics moulding. This typically encompasses an extruder in which the plastics material is plastified and an injection cylinder into which the plastified plastics material is fed, if appropriate with a pressure accumulator installed between these, the plastics material then being injected from the injection cylinder into a mould. The multicomponent elements with cores or layers composed of woven or nonwoven fibres are produced by using a reciprocating-plate machine with two operating regions A and B. The fibre material here is formed in one operating region A in a cavity of the mould system to give a preform, and at the same time ("in the same cycle") plastic is injected in operating region B around a preform manufactured from fibre material in a previous cycle or plastic is moulded onto the material. The reciprocating plate is then rotated around an axis in such a way that the preform is transported from operating region A into operating region B, while the finished plastics moulding is removed and the production cycle begins again.

Other than the said reciprocating-plate mould systems, there are also known mould systems with slidebar elements or with turntable elements, permitting similar production of multicomponent mouldings in a cycle. Multicomponent machines used for this purpose are available in a very wide variety of designs, e.g. with regard to arrangement of the assembly in the V, L, R, P position, for the design of bi-injection techniques, coreback techniques, transfer techniques or rotary techniques, or else the design of sandwich processes.

When multicomponent mouldings are produced in the said processes involving cycles and have a plastics component and a rubber component, a factor which proves to be very disadvantageous for cycle time is that vulcanization of the rubber component needs a markedly longer period. The resultant longer cycle times greatly impair the cost-effectiveness of the process: vulcanization times of a plurality of minutes are the rule, and the further process times have to be added to these, e.g. for the movements to open the mould system. These processes are therefore only very little used for the production of plastics-rubber mouldings.

For certain applications there is a very high level of interest in multicomponent plastics-rubber mouldings with good heat resistance and good oil resistance, especially in the automobile sector. There is demand, for example, for sealing functional elements in the cooling circulation system and oil circulation system or for components and component groups which are intended to have a "hard-soft" characteristic and are in contact with various media and alongside this have exposure to relatively high temperature. Examples that may be mentioned here are oil sumps with a peripheral gasket, housing covers with a peripheral gasket cover, valve covers with a peripheral gasket, thermostat housings and other modules of the radiator with a peripheral gasket, and also structural components with damping elements.

The object of the present invention therefore consisted in providing a multicomponent system based on a plastics component and on a rubber component, and also permitting the production of plastics-rubber composite articles in a cycle, and in particular with cycle times which are comparable with the cycle times when thermoplastics are used exclusively. The object also consisted in providing a multicomponent system of this type which does not necessarily demand the use of additional adhesion promoters and which at the same time supplies plastics-rubber composite articles with high temperature resistance and also with oil resistance.

This object has been achieved via the combination of a thermoplastics component with a specific rubber component which comprises a combination of at least two peroxide crosslinking agents.

The invention provides a multicomponent system comprising
1) a thermoplastic component and
2) a rubber component comprising
   a) one or more elastomers,
      where those elastomers of which 30% by weight or more are present in the rubber component, based on 100% by weight as the entirety of all of the elastomers of the rubber component, must be peroxidically vulcanizable, and
   b) two or more peroxidic crosslinking agents, where at least one peroxidic crosslinking agent whose decomposition temperature $T_{1/2}$ (1 h) is in the range from 70 to 130° C. and at least one second peroxidic crosslinking agent whose decomposition temperature $T_{1/2}$ (1 h) is in the range from 120 to 160° C. is used, where at least two peroxidic crosslinking agents are present whose difference in decomposition temperature $T_{1/2}$ (1 h) is at least 5° C.

Surprisingly, the combination of these individual components in the inventive multicomponent systems specifically permits processing to give plastics-rubber mouldings that proceeds with cycle times which correspond to those of familiar plastics mouldings. The plastics-rubber composite mouldings obtained in the process feature high temperature resistance and oil resistance and are used, for example, as components providing excellent sealing and/or damping.

Thermoplastic Component 1)

Thermoplastic component 1) in the inventive multicomponent system comprises one or more thermoplastics.

Typical and suitable thermoplastics here are polyamides, polyimides, polyethers, polyesters, polyphenylene sulphide (PPS) and/or polycarbonates. It is possible to use an individual thermoplastic or else a combination of various thermoplastics.

A feature of all of the abovementioned thermoplastics is a softening point greater than or equal to 180° C. It is preferable that thermoplastics of this type whose softening point is greater than or equal to 200° C. are used in thermoplastic component 1).

It is particularly preferable that one or more polyamides whose softening point is greater than or equal to 200° C., in particular greater than or equal to 210° C., are used in thermoplastic component 1).

The thermoplastic polyamides to be used with preference according to the invention can be prepared by various processes and synthesized from a very wide variety of units. They can be used alone or else in the form of polyamide moulding compositions, i.e. in combination with processing aids, stabilizers, polymeric alloy partners (e.g. elastomers) or else reinforcing materials (e.g. mineral fillers or glass fibres) for purposes of specific adjustment of combinations of properties.

Other suitable materials are blends of polyamides with fractions of other polymers, e.g. of polyethylene, polypropylene, ABS (acrylonitrile-butadiene-styrene copolymer), and one or more compatibilizers can be used here if appropriate. The properties of the polyamides can be improved via addition of elastomers, e.g. with respect to the impact resistance of reinforced polyamides. The wide variety of possible combinations permits preparation of a very wide variety of thermoplastics components with very different properties.

There is a wide variety of procedures known for preparation of polyamides, and different monomer units are used here as a function of the desired final product, as also are various chain regulators to set a desired molecular weight, or else monomers having reactive groups for post-treatments subsequently envisaged.

The industrially relevant processes for preparation of polyamides mostly proceed by way of polycondensation in the melt. The hydrolytic polymerization of lactams is also understood to be polycondensation for these purposes.

Particularly preferred polyamides are semicrystalline polyamides which can be prepared starting from diamines and dicarboxylic acids and/or from lactams having at least five ring members or from corresponding amino acids.

Monomers that can be used are firstly aliphatic and/or aromatic dicarboxylic acids, e.g. adipic acid, 2,2,4- and 2,4,4-trimethyladipic acid, azelaic acid, sebacic acid, isophthalic acid or terephthalic acid. Other monomers that can be used are aliphatic and/or aromatic diamines, e.g. tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, e.g. aminocaproic acid, or the corresponding lactams. Copolyamides composed of more of the monomers mentioned are included.

For the inventive multicomponent systems it is particularly preferable to use polyamides based on caprolactams, in particular ε-caprolactam, or else on compounded materials based on PA6, PA66 and on other aliphatic and/or aromatic polyamides and, respectively, copolyamides and having from 3 to 11 methylene groups in the polymer chain for each polyamide group.

The semicrystalline polyamides to be used according to the invention can also be used in a mixture with other polyamides and/or with further polymers.

Conventional additives can be admixed in the melt with the polyamides or applied to the surface.

Examples of conventional additives are stabilizers (e.g. UV stabilizers, heat stabilizers or gamma radiation stabilizers), antistatic agents, flow aids, mould-release agents, flame-retardant additives, emulsifiers, nucleating agents, plasticizers, lubricants, dyes, pigments, and also additives for increasing electrical conductivity. The additives can be used alone in a mixture or in the form of masterbatches.

Examples of stabilizers that can be used are metal salts, in particular copper compounds, sterically hindered phenols, hydroquinones, aromatic secondary amines, e.g. diphenylamines, substituted resorcinols, salicylates, benzotriazoles and benzophenones, and also various substituted representatives of these groups and their mixtures.

Examples of flow aids that can be used are low-molecular-weight compounds or branched, highly branched or dendritic polymers whose polarity is similar to that of the polymer resin, or else copolymers of olefins with methacrylic or acrylic esters of aliphatic alcohols, the MFI (melt flow index) of these being not less than 50 g/10 min.

Examples of pigments or dyes that can be used are titanium dioxide, zinc sulphide, ultramarine blue, iron oxide, carbon black, phthalocyanines, quinacridones, perylenes, nigrosin or anthraquinones.

Examples of nucleating agents that can be used are sodium phenylphosphinate or calcium phenylphosphinate, aluminium oxide, silicon dioxide, and also preferably talc.

Examples of lubricants and mould-release agents that can be used are ester waxes, pentaerythritol tetrastearate (PETS), long-chain fatty acids (e.g. stearic acid or behenic acid) and esters, their salts (e.g. Ca stearate or Zn stearate), and also amide derivatives (e.g. ethylenebisstearylamide) or montan waxes (mixtures composed of straight-chain, saturated carboxylic acids whose chain lengths are from 28 to 32 carbon atoms), and also low-molecular-weight polyethylene waxes and low-molecular-weight polypropylene waxes.

Examples of plasticizers that can be used are dioctyl phthalate, dibenzyl phthalate, butyl benzyl phthalate, hydrocarbon oils, N-(n-butyl)benzenesulphonamide.

Additives that can be added to increase electrical conductivity are carbon blacks, conductive carbon blacks, carbon fibrils, nanoscale graphite fibres, nanoscale carbon fibres, graphite, conductive polymers, metal fibres, and also other conventional additives for increasing electrical conductivity.

Nanoscale fibres that can be used with preference are "single wall carbon nanotubes" or "multiwall carbon nanotubes" (e.g. from Hyperion Catalysis).

There can be a filler or reinforcing material present in the polyamides to be used according to the invention. The filler or reinforcing material used can also comprise a mixture composed of two or more different fillers and/or reinforcing materials, e.g. based on talc, mica, silicate, quartz, titanium dioxide, wollastonite, kaolin, amorphous silicas, magnesium carbonate, chalk, feldspar, barium sulphate, glass beads and/or fibrous fillers and/or reinforcing materials based on carbon fibres and/or glass fibres.

It is preferable to use particulate mineral fillers based on talc, mica, silicate, quartz, titanium dioxide, wollastonite, kaolin, amorphous silicas, magnesium carbonate, chalk, feldspar, barium sulphate and/or glass fibres. It is particularly preferable to use particulate mineral fillers based on talc, wollastonite, kaolin and/or glass fibres.

The filler and/or reinforcing material can, if appropriate, have been surface-modified, e.g. with an adhesion promoter or with an adhesion-promoter system, e.g. based on silane. However, the pretreatment is not absolutely essential. Particularly when glass fibres are used, it is also possible to use polymer dispersions, film formers, branching agents and/or glass fibre processing aids, in addition to silanes.

The particularly preferred glass fibres to be used according to the invention, whose fibre diameter is generally from 7 to 18 μm, preferably from 9 to 15 μm, are added in the form of continuous-filament fibres or in the form of chopped or ground glass fibres. The fibres can have been modified with a suitable sizing system and with an adhesion promoter or, respectively, adhesion-promoter system, e.g. based on silane.

Examples of silane-based adhesion promoters commonly used for pretreatment are silane compounds of the general formula (I)

$$(X-(CH_2)_q)_k-Si-(O-C_rH_{2r+1})_{4-k} \qquad (I)$$

where the substituents are as follows:
X is $NH_2-$, $HO-$ or

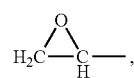

q is a whole number from 2 to 10, preferably from 3 to 4,
r is a whole number from 1 to 5, preferably from 1 to 2 and
k is a whole number from 1 to 3, preferably 1.

Preferred adhesion promoters are silane compounds from the group of aminopropyltrimethoxysilane, aminobutyltrimethoxysilane, aminopropyl-triethoxysilane, aminobutyltriethoxysilane, and also the corresponding silanes which contain a glycidyl group as substituent X.

The amounts generally used of the silane compounds for surface-coating for modification of the fillers is from 0.05 to 2% by weight, preferably from 0.25 to 1.5% by weight and in particular from 0.5 to 1% by weight, based on the mineral filler.

As a consequence of the processing to give the moulding composition or to give the moulding, the $d_{97}$ or $d_{50}$ value of the particulate fillers in the moulding composition or in the moulding can be smaller than in the fillers originally used. The $d_{97}$ or $d_{50}$ data mean that the diameter of 97 or, respectively, 50% by weight of the particle is smaller than the stated value, when particle size distribution is determined by means of an ultracentrifuge.

As a consequence of the processing to give the moulding composition or to give the moulding, the length distributions of the glass fibres in the moulding composition or in the moulding can be shorter than those originally used.

The thermoplastic component features high dimensional stability even at high temperatures, together with high flowability. The plastics component moreover has high oil resistance in commonly used engine oils, and also in industrial fluids and in fluids commonly used in motor vehicles.

Component 2) (Rubber Component)

The rubber component 2) in the inventive multicomponent system comprises one or more elastomers, where those elastomers present at 30% by weight or more in the rubber component are based on 100% by weight as the entirety of all of the elastomers present in the rubber component, have to be peroxidically vulcanizable.

Examples of elastomers that can be used are the following:
nitrile rubber (also abbreviated to NBR)
hydrogenated nitrile rubber (also abbreviated to HNBR)
EVM
EDPM
AEM
ACM
fluororubber
chloroprene rubber
chlorinated polyethylene (CM)

Nitrile Rubbers (NBR)

For the purposes of this application, nitrile rubbers, also known by the abbreviated term NBR, are co- or terpolymers which contain repeat units of at least one conjugated diene, of at least one α,β-unsaturated nitrile and, if appropriate, of one or more other copolymerizable monomers.

The conjugated diene can be of any type. It is preferable to use $C_4$-$C_6$ conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The α,β-unsaturated nitrile used can comprise any known α,β-unsaturated nitrile, and preference is given to $C_3$-$C_5$ α,β-unsaturated nitrites, such as acrylonitrile, methacrylonitrile, ethacrylonitrile or a mixture of these. Acrylonitrile is particularly preferred.

Particularly preferred nitrile rubber is provided by a copolymer based on acrylonitrile and 1,3-butadiene.

Alongside the conjugated diene and the α,β-unsaturated nitrile, it is also possible to use one or more other monomers known to the person skilled in the art, examples being α,β-unsaturated mono- or dicarboxylic acids, or their esters or amides. Preferred α,β-unsaturated mono- or dicarboxylic acids here are fumaric acid, maleic acid, acrylic acid and methacrylic acid. Preferred esters used of the α,β-unsaturated carboxylic acids are their alkyl esters and alkoxyalkyl esters. Particularly preferred alkyl esters of the α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of the α,β-unsaturated carboxylic acids are methoxyethyl (meth)acrylate and ethoxyethyl(meth)acrylate. Mixtures of alkyl esters, e.g. of those mentioned above, with alkoxyalkyl esters, e.g. in the form of the abovementioned, can also be used.

The proportions of conjugated diene and of α,β-unsaturated nitrile in the NBR polymers to be used can vary widely. The proportion of the conjugated diene or of the entirety of the conjugated dienes is usually in the range from 40 to 90% by weight and preferably in the range from 55 to 75%, based on the entire polymer. The proportion of the α,β-unsaturated nitrile or of the entirety of the α,β-unsaturated nitriles is usually from 10 to 60% by weight, preferably from 25 to 45% by weight, based on the entire polymer. The proportions of the monomers in each case give a total of 100% by weight. The amounts that can be present of the additional monomers are from 0.1 to 40% by weight, preferably from 1 to 30% by weight, based on the entire polymer. In this case, corresponding proportions of the conjugated diene(s) and, respectively, of the α,β-unsaturated nitrile(s) are replaced via the proportions of the additional monomers, and the proportions of all of the monomers here in each case give a total of 100% by weight.

The preparation of the nitrile rubbers via polymerization of the above-mentioned monomers is well known to the person skilled in the art and is extensively described in the literature (e.g. Houben-Weyl, Methoden der Organischen Chemie [Methods of organic chemistry], Vol. 14/1, Georg Thieme Verlag Stuttgart 1961).

Other nitrile rubbers which can be used for the purposes of the invention are available commercially, e.g. as products from the product range with trademarks Perbunan® and Krynac® from Lanxess Deutschland GmbH.

Hydrogenated Nitrile Rubbers (HNBR)

For the purposes of this application, hydrogenated nitrile rubbers are co- or terpolymers based on at least one conjugated diene, at least one α,β-unsaturated nitrile and, if appropriate, other copolymerizable monomers, and in which the C=C double bonds of the diene units incorporated into the polymer have been hydrogenated entirely or to some extent. The degree of hydrogenation of the diene units incorporated into the polymer is usually in the range from 50 to 100%, preferably in the range from 85 to 100% and particularly preferably in the range from 95 to 100%.

The conjugated diene can be of any type. It is preferable to use $C_4$-$C_6$ conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The α,β-unsaturated nitrile used can comprise any known α,β-unsaturated nitrile, and preference is given to $C_3$-$C_5$ α,β-unsaturated nitrites, such as acrylonitrile, methacrylonitrile, ethacrylonitrile or a mixture of these. Acrylonitrile is particularly preferred.

Alongside the conjugated diene and the α,β-unsaturated nitrile, it is also possible to use one or more other monomers known to the person skilled in the art, examples being α,β-unsaturated mono- or dicarboxylic acids, or their esters or amides. Preferred α,β-unsaturated mono- or dicarboxylic acids here are fumaric acid, maleic acid, acrylic acid and methacrylic acid. Preferred esters used of the α,β-unsaturated carboxylic acids are their alkyl esters and alkoxyalkyl esters. Particularly preferred alkyl esters of the α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of the α,β-unsaturated carboxylic acids are methoxyethyl (meth)acrylate and ethoxyethyl(meth)acrylate. Mixtures of alkyl esters, e.g. of those mentioned above, with alkoxyalkyl esters, e.g. in the form of the abovementioned, can also be used.

The proportions of conjugated diene and of α,β-unsaturated nitrile in the hydrogenated nitrile rubbers to be used can vary widely. The proportion of the conjugated diene or of the entirety of the conjugated dienes is usually in the range from 40 to 90% by weight and preferably in the range from 50 to 80% by weight, based on the entire polymer. The proportion of the α,β-unsaturated nitrile or of the entirety of the α,β-unsaturated nitrites is usually from 10 to 60% by weight, preferably from 20 to 50% by weight, based on the entire polymer. The amounts that can be present of the additional monomers are from 0.1 to 40% by weight, preferably from 1 to 30% by weight, based on the entire polymer. In this case, corresponding proportions of the conjugated diene(s) and, respectively, of the α,β-unsaturated nitrile(s) are replaced via the proportions of the additional monomers, and the proportions of all of the monomers here in each case give a total of 100% by weight.

The preparation of these hydrogenated nitrile rubbers which are suitable for the inventive multicomponent system is well known to the person skilled in the art.

The literature (e.g. Houben-Weyl, Methoden der Organischen Chemie [Methods of organic chemistry] Vol. 14/1, Georg Thieme Verlag Stuttgart 1961) gives a comprehensive description of the manner in which the abovementioned monomers are then polymerized to prepare the nitrile rubbers.

The Mooney viscosity of the hydrogenated nitrile rubbers used in the inventive multicomponent systems (ML 1+4@100° C.) is in the range from 1 to 120 MU, preferably in the range from 5 to 80 MU, particularly preferably in the range from 10 to 70 MU (MU=Mooney units). Mooney viscosity is determined here to ASTM D1646.

The hydrogenated nitrile rubbers that can be used in the multicomponent systems usually have a number-average molecular weight $M_n$ in the range from 35 000 to 300 000, preferably in the range from 60 000 to 300 000 and particularly preferably in the range from 60 000 to 250 000 and very particularly preferably in the range from 80 000 to 200 000 and most preferably in the range from 70 000 to 200 000. They moreover have a polydispersity index $D=M_w/M_n$ in the range from 1.5 to 4, preferably in the range from 2 to 4, particularly preferably in the range from 2 to 3.7 and in particular in the range from 2.2 to 3.3 and very particularly preferably in the range from 2.2 to 3.0, where $M_w$ is the weight-average molecular weight and $M_n$ is the number-average molecular weight.

Hydrogenated nitrile rubbers of this type are commercially available. Examples of hydrogenated nitrile rubbers are fully and partially hydrogenated nitrile rubbers with acrylonitrile contents in the range from 20 to 50% by weight (Therban® range from Lanxess Deutschland GmbH, and also Zetpol® range from Nippon Zeon Corporation). Examples of hydrogenated butadiene-acrylonitrile-acrylate polymers are the Therban®LT range from Lanxess Deutschland GmbH, e.g. Therban®LT 2157, and also Therban®VP KA 8882. An example of carboxylated hydrogenated nitrile rubbers is the Therban®XT range from Lanxess Deutschland GmbH. Examples of hydrogenated nitrile rubbers with low Mooney viscosities and therefore with improved processability are products from the Therban® AT range, e.g. Therban AT VP KA 8966.

Ethylene-Vinyl Acetate Copolymers (EVM)

One or more ethylene-vinyl acetate copolymers based on ethylene and vinyl acetate as monomers can also be present as elastomer(s) in component 2) of the inventive multicomponent system. The ethylene content can usually be in the range from 5 to 70% by weight, the vinyl acetate content being in the range from 95 to 30% by weight.

Ethylene-vinyl acetate copolymers which can be used for the purposes of the invention are commercially available, e.g. as products from the product range with trade name Levapren® and Levamelt® from Lanxess Deutschland GmbH, or else can be prepared by familiar methods known to the person skilled in the art.

EPDM Rubbers

One or more EPDM rubbers can also be present as elastomer(s) in component 2) of the inventive multicomponent system.

These are polymers prepared via terpolymerization of ethylene and of relatively large proportions of propylene, and also of a few % by weight of a third monomer having diene structure. The diene monomer here provides the double bonds needed for any subsequent vulcanization. Diene monomers mainly used are cis,cis-1,5-cyclooctadiene (COD), exo-dicyclopentadiene (DCP), endo-dicyclopentadiene (EDCP), 1,4-hexadiene (HX) and also 5-ethylidene-2-norbornene (ENB).

EPDM rubbers which can be used for the purposes of the invention are commercially available, e.g. as products from the product series with trade name Buna EPG® and BUNA EPT® from Lanxess Deutschland GmbH, or else can be prepared by methods familiar to the person skilled in the art.

EPDM and EVM rubbers that can be used in the rubber component in the inventive multicomponent systems are those that have been modified via grafting of other monomers, e.g. maleic anhydride, maleic anhydride half-esters, acrylic acid or methacrylic acid, or via reaction with silanes (hydrosilylation/transesterification).

AEM

One or more AEM rubbers can also be present as elastomer(s) in component 2) of the inventive multicomponent system. These are ethylene-acrylate rubbers with, if appropriate, further termonomers.

AEM rubbers that can be used for the purposes of the invention are commercially available, e.g. as products from the Vamac® product range from DuPont™ or else can be prepared by methods familiar to the person skilled in the art.

ACM

One or more ACM rubbers can also be present as elastomer(s) in component 2) of the inventive multicomponent system. These are polyacrylates, i.e. a copolymer or terpolymer composed of ethyl acrylate and of other acrylates with a certain proportion of a monomer which permits vulcanization. ACM is prepared by means of free-radical initiated emulsion polymerization.

ACM rubbers which can be used for the purposes of the invention are commercially available, e.g. as products from the Hytemp® and Nipol AR® product range from Zeon Chemicals L.P. or else can be prepared by methods familiar to the person skilled in the art.

Peroxidic Crosslinking Agents

The rubber component 2) of the inventive multicomponent system comprises, not only one or more elastomers but also two or more peroxidic crosslinking agents, where at least one peroxidic crosslinking agent whose decomposition temperature $T_{1/2}$ (1 h) is in the range from 70 to 130° C., preferably in the range from 100 to 125° C. and at least one second peroxidic crosslinking agent whose decomposition temperature $T_{1/2}$ (1 h) is in the range from 120 to 160° C., preferably in the range from 130° C. to 150° C., is used, where at least two peroxides are present whose difference in decomposition temperature $T_{1/2}$ (1 h) is at least 5° C.

The expression decomposition temperature $T_{1/2}$ (1 h) is familiar to the person skilled in the art and means the temperature at which half of the peroxidic crosslinking agent has decomposed after one hour.

Examples of peroxidic crosslinking agents whose decomposition temperature $T_{1/2}$ (1 h) is in the range from 70 to 130° C. that can be used are the following:
- bis(2,4-dichlorobenzoyl) peroxide
- dibenzoyl peroxide
- bis(4-chlorobenzoyl) peroxide
- 1,1-bis(tert-butylperoxy)-3,3,5-trimethylcyclohexane
- tert-butyl perbenzoate
- 2,2-bis(t-butylperoxy)butene
- 4,4-di-tert-butylperoxy-substituted nonyl valerate Examples of peroxidic crosslinking agents whose decomposition temperature $T_{1/2}$ (1 h) is in the range from 120 to 160° C. that can be used are the following:
- tert-butyl perbenzoate
- 2,2-bis(tert-butylperoxy)butene
- 4,4-di-tert-butylperoxy-substituted nonyl valerate
- dicumyl peroxide
- 2,5-dimethyl-2,5-di(tert-butylperoxy)hexane
- tert-butyl cumyl peroxide
- 1,3-bis(tert-butylperoxyisopropyl)benzene
- di-tert-butyl peroxide
- 2,5-dimethyl-2,5-di(tert-butylperoxy)hex-3-yne By way of example, a suitable method uses, as peroxidic crosslinking agent, a combination composed of 1,3-bis(tert-butylperoxyisopropyl)benzene and 1,1-bis(tert-butylperoxy)-3,3,5-trimethylcyclohexane, of tert-butyl perbenzoate and di-tert-butyl peroxide, of 1,3-bis(tert-butylperoxyisopropyl)benzene and di-tert-butyl peroxide, or else of tert-butyl perbenzoate and tert-butyl cumyl peroxide.

It can be advantageous also to make use of other activators alongside these peroxidic crosslinking agents: examples of compounds suitable for this purpose being triallyl isocyanurate, triallyl cyanurate, trimethylolpropane tri(meth)acrylate, triallyl trimellitate, ethylene glycol dimethacrylate, butanediol dimethacrylate, trimethylolpropane trimethacryalte, Zn diacrylate, Zn dimethacrylate, 1,2-polybutadiene or N,N-m-phenylenedimaleimide.

The amount used of the peroxidic crosslinking agent whose decomposition temperature $T_{1/2}$ (1 h) is in the range from 70 to 130° C. is usually from 1 to 10 phr, preferably from 2 to 8 phr and particularly preferably from 3 to 6 phr, based on the entirety of the elastomers in the rubber component (2) of the inventive multicomponent system.

The amount used of the peroxidic crosslinking agent whose decomposition temperature $T_{1/2}$ (1 h) is in the range from 120 to 160° C. is usually from 1 to 10 phr, preferably from 2 to 8 phr and particularly preferably from 3 to 6 phr, based on the entirety of the elastomers in the rubber component (2) of the inventive multicomponent system.

The total amount of peroxidic crosslinking agent is usually in the range from 2 to 20 phr, preferably from 4 to 18 phr and particularly preferably from 6 to 16 phr, based on the entirety of the elastomers in the rubber component (2) of the inventive multicomponent system.

The rubber component 2) of the inventive multicomponent system can also comprise conventional rubber additives, alongside one or more elastomers, and also alongside the peroxidic crosslinking agents mentioned.

By way of example, these additives include:
fillers, filler activators, accelerators, antiozonants, antioxidants, processing aids, extender oils, plasticizers, reinforcing materials, mould-release agents, and also scorch inhibitors.

Examples of fillers that can be used are carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Particular filler activators that can be used are organic silanes, e.g. vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Examples of other filler activators are substances with surface activity, e.g. triethanolamine and ethylene glycols whose molar masses are from 74 to 10 000 g/mol. The amount of filler activators is usually from 0 to 10 phr, based on 100 phr of the elastomers in the rubber component 2).

Antioxidants that can be used are particularly those which scavenge a very small number of free radicals during peroxidic vulcanization. These are in particular oligomerized 2,2,4-trimethyl-1,2-dihydroquinoline (TMQ), styrenated diphenylamine (DDA), octylated diphenylamine (OCD) or the zinc salt of 4- and 5-methylmercaptobenzimidazole (ZMB2). Alongside these, the known phenolic antioxidants can also be used, examples being sterically hindered phenols and, respectively, antioxidants based on phenylenediamines. It is also possible to use combinations of the antioxidants mentioned.

The usual amount used of the antioxidants is from about 0 to 5 phr, preferably from 0.5 to 3 phr, based on 100 phr of the elastomers in rubber component 2).

Examples of mould-release agents that can be used are: saturated and partially unsaturated fatty and oleic acids and their derivatives (fatty acid esters, fatty acid salts, fatty alcohols, fatty acid amides), these preferably being used as a constituent of a mixture, and also products that can be applied to the mould surface, e.g. products based on low-molecular-weight silicone compounds, products based on fluoropolymers, and also products based on phenolic resins.

The amount used of the mould-release agents as constituent of a mixture is from about 0 to 10 phr, preferably from 0.5 to 5 phr, based on 100 phr of the elastomers in rubber component 2).

Other possibilities are reinforcement of the vulcanizates with reinforcing agents (fibres) composed of glass, according to the teaching of U.S. Pat. No. 4,826,721, and reinforcement via cords, textiles, fibres composed of aliphatic and of aromatic polyamides (nylon, aramid), of polyesters and of natural fibre products.

An example of a list of admixtures conventional in the rubber industry is found in the SGF Rubber Handbook of the Swedish Institute for Rubber Technology, 10th edition.

Rubber component 2) of the inventive multicomponent system features particular flowability together with oil resistance and high temperature resistance.

One preferred embodiment of the multicomponent system encompasses 1) a thermoplastic component comprising one or more polyamides and/or one or more polyimides, and/or one or more polyethers and/or one or more polyesters and/or one or more PPS and/or one or more polycarbonates, where these thermoplastics have a softening point greater than or equal to 180° C., and also
2) a rubber component comprising
   a) one or more peroxidically crosslinkable hydrogenated nitrile rubbers and/or one or more peroxidically crosslinkable vinyl acetate-ethylene copolymers and/or one or more peroxidically crosslinkable acrylate-ethylene copolymers and/or one or more peroxidically crosslinkable acrylate (co)polymers and/or one or more peroxidically crosslinkable nitrile rubbers and/or one or more peroxidically crosslinkable chloroprene rubbers and/or one or more peroxidically crosslinkable fluororubbers and/or peroxidically crosslinkable chlorinated polyethylene and, if appropriate, further, other elastomers, where any of the abovementioned elastomers of which the amount used is 30% by weight or more, based on 100% by weight of all of the elastomers in component 2), must be peroxidically crosslinkable and
   b) two or more peroxidic crosslinking agents, where at least one peroxidic crosslinking agent whose decomposition temperature $T_{1/2}$ (1 h) is in the range from 70 to 130° C. and at least one peroxidic crosslinking agent whose decomposition temperature $T_{1/2}$ (1 h) is in the range from 120 to 160° C. is used, where at least two crosslinking agents are present whose difference in decomposition temperature $T_{1/2}$ (1 h) is at least 5° C.

A particularly preferred embodiment of the multicomponent system comprises 1) a thermoplastic component comprising one or more polyamides as thermoplastics which have a softening point greater than or equal to 180° C. and
2) a rubber component comprising
   a) one or more peroxidically crosslinkable hydrogenated nitrile rubbers and
   b) two or more peroxidic crosslinking agents, where at least one peroxidic crosslinking agent whose decomposition temperature $T_{1/2}$ (1 h) is in the range from 70 to 130° C. and at least one peroxidic crosslinking agent whose decomposition temperature $T_{1/2}$ (1 h) is in the range from 120 to 160° C. is used, where at least two crosslinking agents are present whose difference in decomposition temperature $T_{1/2}$ (1 h) is at least 5° C.

An alternative embodiment, likewise preferred, involves a multicomponent system encompassing 1) a thermoplastic component and
2) a rubber component which comprises no silane containing a double bond and comprises no di- or polyfunctional maleimide and
   a) one or more elastomers,
      where those elastomers of which 30% by weight or more are present in the rubber component 2), based on 100% by weight as the entirety of all of the elastomers of the rubber component, must be peroxidically vulcanizable, and
   b) two or more peroxidic crosslinking agents, where at least one peroxidic crosslinking agent whose decomposition temperature $T_{1/2}$ (1 h) is in the range from 70 to 130° C., preferably in the range from 100 to 125° C., and at least one second peroxidic crosslinking agent whose decomposition temperature $T_{1/2}$ (1 h) is in the range from 120 to 160° C., preferably in the range from 130 to 150° C., is used, where at least two peroxidic crosslinking agents are present whose difference in decomposition temperature $T_{1/2}$ (1 h) is at least 5° C.

The invention also provides the use of the inventive multicomponent system for production of a rubber-thermoplastic composite moulding.

The constituents of rubber component 2) are used to prepare a moulding composition. The mixture of the essential constituents (a) and (b) and, if appropriate, of further constituents can be prepared here by using, as a function of temperature, the typical mixing apparatuses commonly used in the rubber industry. Either batch-mixing assemblies in the form of mixing rolls or internal mixers or else continuous-mixing assemblies, e.g. mixing extruders, can be used. The method which has proven successful ensures that mixing of constituents (a) and (b) of rubber component 2) takes place at a temperature at which no premature crosslinking occurs.

The rubber-thermoplastic composite article is usually produced using equipment whose fundamental structure permits production in a single cycle. To this end, the equipment typically has a reciprocating-plate machine, a turntable or a slide. Furthermore, it is also possible to produce the plastics-rubber composite article in a two-stage process.

If a machine is used which has a reciprocating plate, a turntable or a slide, a first substituted-cycle is usually used to produce a preform from thermoplastic component 1) in a cavity of the mould system. After a rotary movement of the mould system, or by means of a transfer method, the preform is introduced into a final injection unit of different geometry (for example by means of the rotation method via rotation by 180° or else 1200 in the case of three-cavity mould systems) and rubber component 2) is injected in a second substituted-cycle. Once the rubber component has achieved demoulding stability, the product can be demoulded. The melt temperatures of thermoplastic component 1) tend to be in the range from 180 to 340° C., preferably in the range from 200 to 300° C. The specific injection pressures of thermoplastic component 1) are usually in the range from 200 to 2500 bar, preferably in the range from 500 to 1500 bar, mould system temperatures in the regions controlled to thermoplastics temperatures being in the range from 20 to 200° C., preferably in the range from 80 to 180° C. Temperatures of the composition during pre-processing of material and feed for rubber component 2) are usually in the range from 50 to 160° C. The elastomer component is injected with specific injection pressures in the range from 100 to 3000 bar, preferably in the range from 250 to 2000 bar. The vulcanization temperatures of the elastomer regions which lead to demouldability are usually in the range from 120 to 200° C., preferably in the range from 140 to 190° C. Conditioning tends to take place at a temperature in the range from 120 to 200° C., preferably at a temperature greater than or equal to 140° C.

These values are essentially highly dependent on the geometry of the component (e.g. on the thickness and also on the flow path length), and on the type of gate design and its position (e.g. hot- or cold-runner), and also on the specific properties of the materials. The hold-pressure phase tends to take place in the range from 0 to 3000 bar with hold-pressure times tending from 0 seconds to the opening of the mould system.

The rubber-thermoplastic composite articles obtained feature increased resistance with respect to oils, greases, solvents and fuels, e.g. diesel or petrol, and this is particularly true at relatively high temperatures.

The invention therefore provides the use of the inventive multicomponent system for production of rubber-thermoplastics composite articles, preferably of sealing functional elements, or of components or of component groups in the cooling-circulation or oil-circulation system of automobiles or generally components or component groups which have a hard-soft characteristic, are in contact with various fluids and are thereby exposed to relatively high temperatures.

By way of example, the inventive multicomponent system can be used for production of cylinder covers with peripheral gasket, oil sumps with peripheral gasket, toothed-belt covers with peripheral gasket, chain covers with peripheral gasket, engine housings with gaskets, thermostat housings with peripheral gasket, water tanks with gaskets, radiators with gaskets, oil modules with gaskets, air intake nozzles with seals, housing covers with gaskets, valve covers with gaskets, rubber-coated rolls, flanges, pipe couplings and hose couplings, weatherstrips, gaskets, rollers, or of structural components with damping elements.

Use of the inventive multicomponent system in production of the composite articles inhibits undesired adhesion to the mould system surfaces used, this adhesion being usually observable when rubber components are used; they have a relatively high concentration of reactive groups.

Furthermore, the novel multicomponent system permits for the first time production of the rubber-thermoplastics composite articles in a single step of a process with cycle times which are comparable with the cycle time in production of straight thermoplastics mouldings, encompassing injection times and cooling/hardening times. The process is therefore no longer subject to limits via the otherwise longer cycle times for vulcanization of the rubber component. The rubber component of the inventive multicomponent system permits rapid mould system fill times as a consequence of excellent flow behaviour and rapid vulcanization to the point where stability is sufficient for demoulding.

The process therefore permits the rubber component to be vulcanized in the mould only sufficiently for dimensional stability or demouldability, and permits the necessary final vulcanization to take place in a downstream continuous or batchwise conditioning process. This conditioning can take place either via thermal processes or via inductive processes, such as radiation processes (IR or microwaves, for example). The result is a substantial reduction in cycle time.

Surprisingly, it has been found that the product properties achieved after conditioning at atmospheric pressure are fully comparable with those achieved under pressure in the mould. This is unusual, since a person skilled in the art normally assumes that peroxidic mixtures cannot be vulcanized in the open, because oxygen markedly impairs the vulcanization reaction at the surface of the components and extreme blistering due to the decomposition products of the peroxides is often observed at atmospheric pressure, these factors being detrimental to component function and also to properties.

Surprisingly, use of the specific combination of at least two peroxides with the stated difference in decomposition kinetics and the use of a suitable downstream annealing cycle after demoulding from the moulding system (in one or more stages or with continuously rising temperatures) can achieve cycle times for the vulcanization of the rubber component which are comparable with those for the processing of the thermoplastics component.

Use of the inventive multicomponent system moreover means that it is no longer absolutely necessary to use additional adhesion promoters, either for processing the thermoplastic or for processing the rubber.

Another feature of the process is that the process conditions and component moulds can be studied by means of specific rheological and mechanical FEM simulations, and conclusions can be obtained concerning the manufacturing processes, e.g. the fill behaviour, or else concerning the subsequent behaviour of the component under load. This therefore permits development of particularly high-performance systems with simultaneous reduction in the level of the start-up problems continually and commonly encountered, while using a large number of mould systems and material variants, and permits suitable determination of the necessary sizes of machines and assemblies. This type of combination of process advantages and product properties has hitherto not been achievable.

EXAMPLES

Examples 1-37

Preparation and Study of Compounded Elastomer Materials (Rubber Component 2)

The following substances were used in the examples:

| | |
|---|---|
| Armen ® 18D Prills | Zinc salt of 4- and 5-methyl-2-mercaptobenzimidazole with density of 1.25 g/cm$^3$ at 25° C.; Lanxess Deutschland GmbH |
| Buna ® EPG 5450 | Ethylene-propylene-ENB terpolymer (EPDM) with ethylene content of 52% and Mooney viscosity (ML 1 + 4 @ 125° C.) of 46; Lanxess Deutschland GmbH |
| Buna ® EPT 2450 | Ethylene-propylene-ENB terpolymer (EPDM) with ethylene content of 59% and Mooney viscosity (ML 1 + 8 @ 100° C.) of 35; Lanxess Deutschland GmbH |
| Corax ® N 550 | Carbon black; Fast Extruding Furnace (FEF) from Degussa AG |
| DIAK ® No 7 | Triallyl isocyanurate from DuPont |
| Diplast ® TM 8-10ST | Stab. trimellitates of $C_8$-$C_{19}$ linear alcohols with density of 0.97 g/cm$^3$, Lonza |
| Edenor ® C 18 98-100 | Stearic acid from Cognis Deutschland GmbH&Co. KG |
| Levapren ® 700 HV | Vinyl acetate-ethylene copolymer (EVM) with vinyl acetate content of 70% by weight and Mooney viscosity (ML 1 + 4 @ 100° C.) of 27; Lanxess Deutschland GmbH |
| Levapren ® 600 | Vinyl acetate-ethylene copolymer (EVM) with vinyl acetate content of 60% by weight and Mooney viscosity (ML 1 + 4 @ 100° C.) of 27; Lanxess Deutschland GmbH |
| Maglite ® DE | Magnesium oxide from CP Hall Co |
| PERKADOX ® 14-40 B-PD | 1,3-bis(tert-Butylperoxyisopropyl)benzene from Akzo Nobel Chemicals |
| Rhenofit ® DDA-70 | 70% by weight diphenylamine derivative (dry liquid) from Rhein Chemie Rheinau GmbH |
| Rhenofit ® OCD | Octylated diphenylamine from Rhein Chemie Rheinau GmbH |
| Rhenogran ® PCD50 | Rhenogran ® PCD-50, polycarbodiimide from Rhein Chemie Rheinau GmbH |

| | | |
|---|---|---|
| Therban ® AT 3404 VP | Fully hydrogenated acrylonitrile-butadiene copolymer (HNBR) with acrylonitrile content of 34% by weight and Mooney viscosity (ML 1 + 4 @ 100° C.) of 39; Lanxess Deutschland GmbH | |
| Therban ® A 3407 | Fully hydrogenated acrylonitrile-butadiene copolymer (HNBR) with acrylonitrile content of 34% by weight and Mooney viscosity (ML 1 + 4 @ 100° C.) of 70; Lanxess Deutschland GmbH | |
| Therban ® AT 3904 VP | Fully hydrogenated acrylonitrile-butadiene copolymer (HNBR) with acrylonitrile content of 39% by weight and Mooney viscosity (ML 1 + 4 @ 100° C.) of 39; Lanxess Deutschland GmbH | |
| Therban ® A 3907 | Fully hydrogenated acrylonitrile-butadiene copolymer (HNBR) with acrylonitrile content of 34% by weight and Mooney viscosity (ML 1 + 4 @ 100° C.) of 70; Lanxess Deutschland GmbH | |
| Therban ® VP KA 8889 | Hydrogenated acrylonitrile-butadiene-methacrylic acid terpolymer (HNBR) with acrylonitrile content of 32% by weight and Mooney viscosity (ML 1 + 4 @ 100° C.) of 74; Lanxess Deutschland GmbH | |
| Thermax ® N 990 | Carbon black from Lehmann & Voss | |
| TRIGONOX ® 29-40 B-PD | 1,1-bis(tert-Butylperoxy)-3,3,5-trimethylcyclohexane from Akzo Nobel Chemicals | |
| Vamac ® D | Vamac ® ethylene-acrylate copolymer (EAM) with Mooney viscosity (ML 1 + 4 @ 100° C.) of 22; DuPont de Nemours Int. | |
| Vulkanox ® ZMB2 | Zinc salt of 4- and 5-methyl-2-mercaptobenzimidazole with density of 1.25 g/cm³ at 25° C.; Lanxess Deutschland GmbH | |
| Vulkasil ® A1 | Basic Na aluminium silicate from Lanxess Deutschland GmbH | |
| Zinkoxid aktiv ® | Zinc oxide from Lanxess Deutschland GmbH | |

Examples 1-33 below are examples in which studies were carried out on the rubber components of the multicomponent system. These studies and their results show that selection of two specific peroxidic crosslinking agents with the stated difference in decomposing temperatures is decisive for the crosslinkability of the rubber component and is therefore also decisive for the properties of the composite moulding.

The mixtures listed in Tables 2, 7, 11, 14 and 18 below were prepared using a GK 1.5 E internal mixer from Krupp Elastomertechnik, Hamburg. Table 1a and b shows a summary of the mixing parameters.

In a first step, the constituents of the rubber component, stabilizers and crosslinking activators were used as initial charge and mixed for 1 min. The fillers were then added and the mixture was mixed for a further 4.5 min. At no juncture did the mixing temperature exceed 150° C. The rotation rate was lowered if necessary to prevent occurrence of a higher temperature. Once the prescribed mixing time had ended, the mixer was emptied.

The peroxides were then admixed in a second step on mixing rolls from Krupp Elastomertechnik of diameter 200 mm and width 350 mm, the cooling water temperature being 40° C. The mixing time was about 10 min.

For the tensile test, the hardness test, and also for the compression set test, appropriate test specimens were produced from the compounded elastomer materials and vulcanized for 20 min at 170° C. in a platen press, unless otherwise stated.

TABLE 1a

Mixing parameters for first step

| Mixing parameter | | |
|---|---|---|
| Rotation rate | 1/min | 40 |
| Friction | | 1 |

TABLE 1a-continued

Mixing parameters for first step

| Mixing parameter | | |
|---|---|---|
| Rotor temperature | ° C. | 50 |
| Trough/saddle temp. | ° C. | 50 |
| Ram pressure for sealing mixing chamber | bar | 6 |
| Fill level, based on chamber volume | % | 70 |
| Mixing time | min | 5.5 |

TABLE 1b

Mixing parameters for second step

Addition of peroxides on roll:

| | | |
|---|---|---|
| Roll size (diameter) | mm | 200 |
| Rotation rate | 1/min | 20 |
| Friction | | 1.22 |
| Temp., front roll | ° C. | 40 |
| Temp., rear roll | ° C. | 40 |
| Mixing time | min | 10 |

Examples 1-8

The rubber mixtures 1*, 4* and 5* indicated by "*" have constitutions which on combination with a thermoplastic component would lead to comparative examples for the purposes of this invention, while mixtures 2, 3, 6, 7 and 8 in contrast have constitutions which on combination with a thermoplastic component would lead to inventive examples for the purpose of this invention.

TABLE 2

Constitution of elastomer mixtures 1-8

| | Mixture example | | | | | | | |
|---|---|---|---|---|---|---|---|---|
| | 1* | 2 | 3 | 4* | 5* | 6 | 7 | 8 |
| Therban ® VP KA9866 | 100 | 100 | 100 | 100 | 100 | 100 | 80 | 80 |
| Corax ® N 550 | 30 | 30 | 30 | 30 | 30 | 30 | 30 | 30 |
| Vulkasil ® A1 | 10 | 10 | 10 | 10 | 10 | 10 | 10 | 10 |
| Rhenofit ® DDA-70 | 1.5 | 1.5 | 1.5 | 1.5 | 1.5 | 1.5 | 1.5 | 1.5 |
| Vulkanox ® ZMB2/C5 | 0.5 | 0.5 | 0.5 | 0.5 | 0.5 | 0.5 | 0.5 | 0.5 |
| Zinkoxyd aktiv | 2 | 2 | 2 | 2 | 2 | 2 | — | — |
| Diplast ® TM 8-10/ST | 10 | 10 | — | — | — | 10 | — | — |
| DIAK ® No. 7 | 1.5 | 1.5 | 3 | 3 | 3 | 3 | 1.5 | 1.5 |
| TRIGONOX ® 29-40 B-PD | 12 | 8 | 8 | 12 | 16 | 8 | 8 | 8 |
| PERKADOX ® 14-40 B-PD | — | 8 | 8 | — | — | 8 | 8 | 8 |
| Thermax ® N 990 | — | — | 30 | 30 | 30 | 30 | — | 30 |
| Therban ® VP KA 8889 | — | — | — | — | — | — | 20 | 20 |
| Total phr | 167.5 | 171.5 | 193 | 189 | 193 | 203 | 159.5 | 189.5 |
| Density g/ml | 1.141 | 1.149 | 1.23 | 1.224 | 1.227 | 1.214 | 1.151 | 1.221 |

The properties stated in Table 3 were determined on mixtures 1-8.

Mooney viscosity was measured to DIN D 1646 at 100° C.

TABLE 3

Determination of Mooney viscosities of mixtures 1-8 on test specimens to DIN D 1646

| | Example | | | | | | | |
|---|---|---|---|---|---|---|---|---|
| | 1* | 2 | 3 | 4* | 5* | 6 | 7 | 8 |
| ML 1 + 4 @ 100° C. MU | 47 | 46 | 75 | 79 | 77 | 54 | 73 | 88 |

A Monsanto MDR 2000 rheometer was then used to study (Table 4) the vulcanization behaviour of mixtures 1-8 at a test temperature of 170° C. with a test time of 30 minutes.

TABLE 4

Determination of vulcanization behaviour

| | Example | | | | | | | |
|---|---|---|---|---|---|---|---|---|
| Test variable | 1* | 2 | 3 | 4* | 5* | 6 | 7 | 8 |
| Torque minimum dNm | 0.88 | 0.80 | 1.52 | 1.67 | 1.69 | 1.04 | 1.47 | 1.93 |
| Torque maximum dNm | 8.27 | 18.12 | 31.37 | 14.17 | 19.67 | 23.55 | 23.16 | 27.85 |
| Final torque value dNm | 7.83 | 18.03 | 31.28 | 13.50 | 18.73 | 23.50 | 23.03 | 27.69 |
| TS1 rise time min | 0.37 | 0.40 | 0.34 | 0.31 | 0.28 | 0.37 | 0.38 | 0.35 |
| TS2 rise time min | 0.43 | 0.49 | 0.40 | 0.35 | 0.32 | 0.44 | 0.44 | 0.40 |
| Conversion time min (95% vulcanization) | 1.16 | 7.76 | 8.30 | 1.15 | 1.05 | 8.50 | 7.13 | 7.24 |
| Threshold strength value of 7 dNm achieved after min | 0.94 | 1.03 | 0.59 | 0.48 | 0.40 | 0.80 | 0.67 | 0.53 |
| Max. crosslinking speed dNm/min | 17.20 | 12.90 | 21.60 | 29.30 | 47.00 | 15.20 | 18.80 | 21.80 |
| Tan d of final value | 0.16 | 0.03 | 0.05 | 0.16 | 0.10 | 0.05 | 0.05 | 0.06 |
| Time difference between 90% conversion and 10% conversion min | 0.62 | 5.39 | 5.82 | 0.63 | 0.56 | 5.95 | 4.87 | 5.02 |

Direct comparison of mixture 3 with mixture 5* shows that mixture 5* achieves markedly lower crosslinking density with comparable Mooney viscosity and use of identical amounts by weight of peroxide, this being discernable from the torque maximum, whereas there is only little difference in the TS2 time (this being the value stating the time for which products retain processability at the corresponding temperature). The same applies to the time needed to achieve threshold strength for demoulding (which is established experimentally as desired). Use of two independent free-radical initiators can therefore achieve a low cycle time together with satisfactory product properties (see compression sets) that are not possible when a single rapidly decomposing peroxide is used (Example 5*). Another disadvantage of use of a single rapidly decomposing peroxide is that blisters occur in the vulcanizates with the large peroxide dosage needed. This disadvantage can be substantially avoided with the inventive use of the different peroxides with differentiated decomposition times. Another method that has proven successful here is selection of suitable heating and conditioning cycles.

Table 5: Measurement of Tensile Strength on S2 Specimen at RT
 a) unaged and
 b) after storage at 150° C. for 7 days to DIN 53504

TABLE 5a

| | Example | | | | | | | |
|---|---|---|---|---|---|---|---|---|
| | 1* | 2 | 3 | 4* | 5* | 6 | 7 | 8 |
| TS MPa | 18.4 | 17.2 | 18 | 17.5 | 18.8 | 16.6 | 20.0 | 20.9 |
| EB % | 614 | 299 | 158 | 370 | 284 | 195 | 259 | 219 |
| M25 MPa | 0.7 | 0.9 | 1.7 | 1.2 | 1.3 | 1.2 | 1.2 | 1.6 |
| M50 MPa | 1.0 | 1.4 | 3.5 | 1.7 | 2.1 | 2.3 | 2.0 | 3.1 |
| M75 MPa | 1.2 | 2.2 | 6.2 | 2.3 | 3.1 | 3.9 | 3.1 | 5.2 |
| M100 MPa | 1.4 | 3.1 | 9.5 | 3.2 | 4.5 | 6.2 | 4.7 | 7.8 |
| M150 MPa | 2.3 | 6.0 | 16.9 | 5.6 | 8.1 | 11.7 | 9.0 | 13.7 |
| M200 MPa | 3.5 | 9.5 | | 8.5 | 12.2 | 17.4 | 13.9 | 19.3 |
| M250 MPa | 5.0 | 13.5 | | 11.4 | 16.4 | | 19.1 | |
| M300 MPa | 6.6 | 17.6 | | 14.3 | 19.5 | | | |
| M350 MPa | 8.4 | | | 16.8 | | | | |
| Hardness to DIN 53505 Shore A | 55 | 62 | 75 | 67 | 70 | 69 | 67 | 74 |
| Tear propagation resistance to DIN 53515 N/mm | 28.2 | 14.0 | 9.8 | 19.6 | 15.3 | 10.6 | 10.5 | 12.3 |

TABLE 5b

| | Example | | | | | | | |
|---|---|---|---|---|---|---|---|---|
| | 1* | 2 | 3 | 4* | 5* | 6 | 7 | 8 |
| TS MPa | 17.7 | 16.6 | 19.4 | 17.6 | 19.5 | 18.4 | 20.3 | 21.1 |
| EB % | 537 | 264 | 143 | 296 | 244 | 189 | 189 | 155 |
| M25 MPa | 1.0 | 1.2 | 2.5 | 1.9 | 2.3 | 1.8 | 1.7 | 2.6 |
| M50 MPa | 1.5 | 2.2 | 5.8 | 3.2 | 4.1 | 3.7 | 3.4 | 6 |
| M75 MPa | 2.1 | 3.6 | 9.9 | 4.9 | 6.5 | 6.3 | 6.1 | 10 |
| M100 MPa | 2.8 | 5.3 | 13.8 | 6.9 | 8.9 | 9.2 | 9.2 | 13.9 |
| M150 MPa | 4.6 | 8.9 | | 10.7 | 13.5 | 14.8 | 15.6 | 20.6 |
| M200 MPa | 6.5 | 12.4 | | 13.7 | 17.1 | | | |
| M250 MPa | 8.3 | 15.7 | | 16.0 | 19.8 | | | |
| M300 MPa | 10.1 | | | 17.6 | | | | |
| M350 MPa | 11.6 | | | | | | | |

For the tensile test results, taking the example of mixture 3 and of mixture 5*, comparable strengths can be discerned. On identical dosage in parts by weight of peroxide a higher 50% tensile strain modulus and a higher hardness is found for mixture 3, however, the conclusion being greater efficiency of crosslinking. Furthermore, a study of ageing properties indicates better ageing resistance of mixture 3 when compared with mixture 5*. Deviations from the initial values are found to be smaller for mixture 3 than for mixture 5* for all of the following values: tensile stress at break, tensile strain at break and 50 modulus.

TABLE 6

Measurement of compression set (also abbreviated to C.S.) to DIN 53517 A on a flap acting as test specimen
 a) after 72 hours and
 b) after 168 h

| | Example | | | | | | | |
|---|---|---|---|---|---|---|---|---|
| Test parameters | 1* | 2 | 3 | 4* | 5* | 6 | 7 | 8 |
| Temperature 150° C. Time 72 h Deformation 25% C.S. (compression set) % | 67.6 | 32.7 | 28.9 | 58.5 | 48.1 | 29.3 | 35.8 | 35.4 |
| Temperature 150° C. Time 168 h Deformation 25% C.S. (compression set) % | 73.2 | 43.7 | 38.9 | 66.2 | 54.5 | 35.2 | 43.2 | 43.4 |

A comparison of compression sets shows a marked reduction (i.e. improvement) in the compression sets measured when mixture 3 is compared with mixture 5*. Compression sets<50% are desirable for long-term use as gasket materials.

Examples 9-19

Mixtures 9-19 with the constitution stated in Table 7 were prepared by the stated procedure.

The mixtures indicated by * in Table 7 are examples which in combination with a thermoplastic component would lead to comparative examples for the purposes of this application, and the mixtures with no indication have constitutions which on appropriate combination with a thermoplastic component would lead to inventive examples for the purposes of this application.

TABLE 7

Constitution of mixtures 9-19

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| Therban ® A 3407 | 100 | | | | | 100 | | | | | |
| Therban ® VPKA 8966 | | 100 | | 100 | | | 100 | | | 100 | 100 |
| Therban ® A 3907 | | | 100 | | | | | 100 | | | |
| Therban ® A 3904 | | | | | 100 | | | | 100 | | |
| Corax ® N 550 | 30 | 30 | 30 | 30 | 30 | 30 | 30 | 30 | 30 | 30 | 30 |
| Thermax ® N 990 | 30 | 30 | 30 | 30 | 30 | 30 | 30 | 30 | 30 | 30 | 30 |
| Vulkasil ® A1 | 10 | 10 | 10 | 10 | 10 | 10 | 10 | 10 | 10 | 10 | 10 |
| Rhenofit ® DDA-70 | 1.5 | 1.5 | 1.5 | 1.5 | 1.5 | 1.5 | 1.5 | 1.5 | 1.5 | 1.5 | 1.5 |
| Vulkanox ® ZMB2/C5 | 0.5 | 0.5 | 0.5 | 0.5 | 0.5 | 0.5 | 0.5 | 0.5 | 0.5 | 0.5 | 0.5 |
| Zinkoxyd aktiv | 2 | 2 | 2 | 2 | 2 | 2 | 2 | 2 | 2 | 2 | 2 |
| Maglite ® DE | 2 | 2 | 2 | 2 | 2 | 2 | 2 | 2 | 2 | 2 | 2 |

TABLE 7-continued

Constitution of mixtures 9-19

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| DIAK ® No. 7 | 3 | 3 | 3 | 3 | 3 | 3 | 3 | 3 | 3 | 3 | 3 |
| PERKADOX ® 14-40 B-PD | 10 | 10 | 10 | 10 | | 8 | 8 | 8 | 8 | 5 | 8 |
| Trigonox ® 29 | | | | | 10 | 8 | 8 | 8 | 8 | 5 | 4 |
| Total | 189.0 | 189.0 | 189.0 | 189.0 | 189.0 | 195.0 | 195.0 | 195.0 | 195.0 | 189.0 | 191.0 |

The Mooney viscosity (ML 1+4@100° C.) stated in Table 8a to DIN D 1646 was determined on elastomer mixtures 9-19.

TABLE 8A

Mooney viscosities of elastomer mixtures 9-19

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| ML 1 + 4 @ 100° C. | 121 | 78 | 121 | 80 | 82 | 112 | 75 | 114 | 75 | 81 | 81 |

A Monsanto MDR 2000 rheometer was then used to study the vulcanization behaviour of elastomer mixtures 9-19 at a test temperature of 160° C. (Table 8B) or 170° C. (Table 8C).

TABLE 8B

Testing of mixture on Monsanto MDR 2000 at a test temperature of 160° C., test time: 30 min

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| Minimum torque, dNm | 2.79 | 1.37 | 2.06 | 0.98 | 1.68 | 2.89 | 1.48 | 2.35 | 1.13 | 1.61 | 1.58 |
| Maximum torque, dNm | 42.28 | 36.99 | 40.82 | 37.59 | 11.32 | 45.35 | 44.03 | 45.79 | 41.07 | 28.05 | 37.27 |
| TS2 rise time, min | 1.68 | 2.59 | 1.80 | 2.64 | 0.56 | 0.51 | 0.58 | 0.53 | 0.66 | 0.87 | 0.97 |
| 50% conversion time, min | 11.79 | 13.48 | 12.31 | 13.3 | 0.94 | 6.40 | 7.17 | 6.80 | 7.95 | 9.67 | 10.31 |

TABLE 8C

Testing of mixture on Monsanto MDR 2000 at a test temperature of 170° C., test time: 30 min

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| Minimum torque, dNm | 2.60 | 1.26 | 1.98 | 0.90 | 1.64 | 2.79 | 1.45 | 2.27 | 1.10 | 1.54 | 1.51 |
| Maximum torque, dNm | 42.80 | 37.70 | 41.70 | 38.20 | 10.7 | 45.00 | 44.10 | 45.5 | 41.01 | 27.90 | 37.50 |
| TS2 rise time, min | 0.81 | 1.13 | 0.86 | 1.15 | 0.37 | 0.35 | 0.39 | 0.35 | 0.42 | 0.51 | 0.54 |
| 50% conversion time, min | 4.62 | 5.25 | 4.66 | 5.18 | 0.51 | 2.64 | 2.97 | 2.72 | 3.21 | 3.91 | 4.11 |

Table 9: Tests on Vulcanizates Composed of Mixtures 9-19

TABLE 9A

Tensile test: Test on S2 specimen at RT to DIN 53504, measurement of Shore A hardness at RT to DIN 53505

| | | \multicolumn{11}{c}{Example} |
|---|---|---|---|---|---|---|---|---|---|---|---|---|
| | | 9* | 10* | 11* | 12* | 13* | 14 | 15 | 16 | 17 | 18 | 19 |
| TS | MPa | 22.8 | 21.3 | 22.6 | 20.7 | 15.2 | 22.4 | 21.6 | 21.9 | 20.7 | 21.6 | 22.3 |
| EB | % | 157 | 159 | 161 | 148 | 508 | 142 | 141 | 136 | 138 | 208 | 165 |
| M100 | MPa | 13.1 | 11.8 | 13.4 | 13.1 | 2.2 | 14.2 | 13.9 | 14.4 | 13.7 | 7.8 | 11.7 |
| Hardness | Shore A | 78 | 76 | 78 | 78 | 63 | 79 | 78 | 80 | 79 | 73 | 76 |

TABLE 9B

Measurement of compression set to DIN 53517A at 150° C., 168 h and 25% deformation

| | | Example | | | | | | | | | | |
|---|---|---|---|---|---|---|---|---|---|---|---|---|
| | | 9* | 10* | 11* | 12* | 13* | 14 | 15 | 16 | 17 | 18 | 19 |
| C.S. | % | 27.6 | 29.3 | 29.4 | 31.7 | 75.8 | 29.6 | 30.3 | 30.9 | 30.9 | 39.1 | 30.9 |

TABLE 9C

Tensile test on S2 specimen at RT to DIN 53504 and Shore A hardness at RT to DIN 53505, using specimens which had been stored at 150° C. in hot air for 7 days.

| | | Example | | | | | | | | | | |
|---|---|---|---|---|---|---|---|---|---|---|---|---|
| | | 9* | 10* | 11* | 12* | 13* | 14 | 15 | 16 | 17 | 18 | 19 |
| TS | MPa | 22.9 | 22.2 | 23.7 | 22.8 | 15.7 | 22.8 | 22.8 | 23.3 | 23 | 21.6 | 22.2 |
| EB | % | 141 | 147 | 136 | 138 | 470 | 125 | 132 | 129 | 134 | 200 | 149 |
| M100 | MPa | 16.6 | 15.5 | 17.6 | 17.3 | 5.4 | 18.9 | 18.1 | 19 | 18 | 12.5 | 16 |
| Hardness | Shore A | 84 | 84 | 85 | 85 | 76 | 86 | 85 | 87 | 87 | 82 | 84 |

TABLE 9D

Tensile test on S2 specimen at RT to DIN 53504 and Shore A hardness at RT to DIN 53505, using specimens which had been stored at 150° C. in Shell Helix 5W40 engine oil for 7 days.

| | | Example | | | | | | | | | | |
|---|---|---|---|---|---|---|---|---|---|---|---|---|
| | | 9* | 10* | 11* | 12* | 13* | 14 | 15 | 16 | 17 | 18 | 19 |
| TS | MPa | 25.2 | 22.9 | 26.6 | 23.3 | 24.7 | 25.1 | 21.8 | 25 | 24.1 | 23.7 | 23.7 |
| EB | % | 130 | 126 | 135 | 124 | 287 | 125 | 113 | 126 | 124 | 160 | 134 |
| M100 | MPa | 18.7 | 17.5 | 19.9 | 18.8 | 6.4 | 19.5 | 18.8 | 19.6 | 19.4 | 12.7 | 16.9 |
| Hardness | Shore A | 79 | 78 | 80 | 80 | 69 | 80 | 79 | 81 | 81 | 75 | 78 |
| Volume change (prior to and after storage in engine oil) % | | 1.32 | 1.73 | −1.24 | −1.13 | 2.15 | 0.61 | 1.16 | −1.88 | −1.75 | 2.3 | 1.83 |

Comparison of mixtures without * indicator based on HNBR rubber with the examples with * indicator again shows marked advantages in the combination of rapid crosslinking (small TS2 values and 50% conversion times—corresponding to short demoulding/cycle times in the 2c process) with low compression set values while other physical properties are excellent, e.g. high strength and low volume swelling in, for example, engine oil. The experiment to simulate vulcanization behaviour in a 2c mould system by means of brief surface heating in a press combined with a downstream conditioning process at atmospheric pressure using appropriately adjusted conditioning (in this case in two stages) shows that this process, too, gives blister-free mouldings with properties comparable to those from traditional vulcanization under pressure, cf. Table 10.

Tables 10: Vulcanizate Testing on Conditioned Mixtures 9-19

For testing of the properties of vulcanizates of conditioned mixtures 9-19, test sheets of thickness 2 or 6 mm measuring 100 mm by 100 mm were heated and pressed between 1 mm Teflon film in a preheated platen press and then removed and then conditioned at atmospheric pressure in a conditioning oven in hot air for 20 min at 160° C. and 20 min at 170° C.

TABLE 10A

Heating times for vulcanization of test sheets of dimensions 100 mm by 100 mm.

| | Example | | | | | | | | | | |
|---|---|---|---|---|---|---|---|---|---|---|---|
| | 9* | 10* | 11* | 12* | 13* | 14 | 15 | 16 | 17 | 18 | 19 |
| Heating time for sheet of thickness 2 mm sec | 80 | 120 | 100 | 120 | 45 | 30 | 40 | 30 | 50 | 80 | 70 |
| Heating time for sheet of thickness 6 mm sec | 110 | 150 | 130 | 150 | 75 | 60 | 70 | 60 | 80 | 110 | 100 |

TABLE 10B

Tensile test on S2 specimen (stamped out from the test sheets of Table 10A) at RT to DIN 53504 and Shore hardness A at RT to DIN 53505

| | | Example | | | | | | | | | | |
|---|---|---|---|---|---|---|---|---|---|---|---|---|
| | | 9* | 10* | 11* | 12* | 13* | 14 | 15 | 16 | 17 | 18 | 19 |
| TS | MPa | 20.4 | 18.7 | 20.3 | 19 | 14.7 | 18.4 | 19.9 | 19.4 | 18.3 | 21.3 | 20.4 |
| EB | % | 156 | 155 | 158 | 159 | 509 | 132 | 140 | 146 | 142 | 233 | 169 |
| M100 | MPa | 12.3 | 11.9 | 12.7 | 11.4 | 2.7 | 13.2 | 12.9 | 13.3 | 12.8 | 7.2 | 10.3 |
| Hardness | Shore A | 78 | 77 | 78 | 78 | 68 | 80 | 80 | 82 | 80 | 74 | 77 |

TABLE 10C

Tensile test: S2 specimen at RT to DIN 53504 (stamped out from the test sheets of Table 10A) and hardness at RT to DIN 53505 using the specimens which had been stored at 150° C. in Shell Helix 5 W40 engine oil for 7 days.

| | | Example | | | | | | | | | | |
|---|---|---|---|---|---|---|---|---|---|---|---|---|
| | | 9* | 10* | 11* | 12* | 13* | 14 | 15 | 16 | 17 | 18 | 19 |
| TS | MPa | 20.1 | 19.8 | 21 | 20.1 | 23.4 | 19 | 21.7 | 18.3 | 19.9 | 21.8 | 21.8 |
| EB | % | 126 | 132 | 126 | 131 | 338 | 115 | 132 | 110 | 126 | 177 | 150 |
| M100 | MPa | 15.1 | 14.6 | 16.2 | 14.9 | 5.2 | 16.1 | 15.8 | 16.5 | 15.6 | 10.8 | 13.7 |
| Hardness | Shore A | | | | | 70 | | 80 | | | 76 | 78 |
| Volume change (prior to and after storage in engine oil) % | | 4.43 | 4.18 | 1.49 | 1.43 | 4.16 | 3.83 | 4.26 | 1.4 | 1.62 | 4.14 | 4.02 |

Examples 20-28

Mixtures 20-28 with the constitution stated in Table 11 were prepared by the stated procedure. The mixtures indicated by * are examples which in combination with a thermoplastic component would lead to comparative examples and the mixtures with no indication have constitutions which on appropriate combination with a thermoplastic component would lead to inventive examples.

TABLE 11

Constitution of mixtures 20-28

| | Example | | | | | | | | |
|---|---|---|---|---|---|---|---|---|---|
| | 20* | 21* | 22* | 23* | 24* | 25* | 26 | 27 | 28 |
| Levapren ® 700 | 100 | 100 | 100 | | | | 100 | 100 | |
| Levapren ® 600 | | | | 100 | 100 | 100 | | | 100 |
| Corax ® N 550 | 30 | 30 | 30 | 30 | 30 | 30 | 30 | 30 | 30 |
| Thermax ® N 990 | 30 | 30 | 30 | 30 | 30 | 30 | 20 | 30 | 30 |
| Vulkasil ® A1 | 10 | 10 | 10 | 10 | 10 | 10 | 10 | 10 | 10 |
| Rhenofit ® DDA-70 | 1 | 1 | 1 | 1 | 1 | 1 | 1 | 1 | 1 |
| Vulkanox ® ZMB2/C5 | 0.5 | 0.5 | 0.5 | 0.5 | 0.5 | 0.5 | 0.5 | 0.5 | 0.5 |
| Zinkoxyd aktiv | 2 | 2 | 2 | 2 | 2 | 2 | 2 | 2 | 2 |
| Maglite ® DE | 2 | 2 | 2 | 2 | 2 | 2 | 2 | 2 | 2 |

TABLE 11-continued

Constitution of mixtures 20-28

| | Example | | | | | | | | |
|---|---|---|---|---|---|---|---|---|---|
| | 20* | 21* | 22* | 23* | 24* | 25* | 26 | 27 | 28 |
| EDENOR ® C 18 98-100 | 1 | 1 | 1 | 1 | 1 | 1 | 1 | 1 | 1 |
| Rhenogram ® PCD50 | 3 | 3 | 3 | 3 | 3 | 3 | 3 | 3 | 3 |
| DIAK ® No. 7 | 3 | 3 | 3 | 3 | 3 | 3 | 3 | 3 | 3 |
| PERKADOX ® 14-40 B-PD | 12 | | | 12 | | | 7 | 8 | 8 |
| Trigonox ® 29 | | 12 | 16 | | 12 | 16 | 7 | 8 | 8 |
| Total phr | 195 | 195 | 199 | 195 | 195 | 199 | 187 | 199 | 199 |

Tables 12: Tests on Mixtures 20-28

The Mooney viscosity (ML 1+4@100° C.) stated in Table 12 A was determined to DIN D 1646.

TABLE 12A

| | Example | | | | | | | | |
|---|---|---|---|---|---|---|---|---|---|
| | 20* | 21* | 22* | 23* | 24* | 25* | 26 | 27 | 28 |
| ML 1 + 4 @ 100° C. | 43 | 44 | 41 | 45 | 46 | 43 | 39 | 40 | 42 |

TABLE 12B

Testing of mixture on Monsanto MDR 2000 at a test temperature of 160° C., test time: 30 min

| | Example | | | | | | | | |
|---|---|---|---|---|---|---|---|---|---|
| | 20* | 21* | 22* | 23* | 24* | 25* | 26 | 27 | 28 |
| Minimum torque, dNm | 0.61 | 0.79 | 0.76 | 0.75 | 0.93 | 0.93 | 0.6 | 0.69 | 0.81 |
| Maximum torque, dNm | 44 | 23.6 | 26.4 | 47.4 | 26.4 | 29.5 | 31.3 | 39.3 | 41.3 |
| TS2 rise time, min | 1.43 | 0.43 | 0.38 | 1.34 | 0.4 | 0.35 | 0.59 | 0.55 | 0.48 |
| 50% conversion time, min | 6.09 | 0.75 | 0.64 | 5.82 | 0.7 | 0.59 | 1.92 | 2.42 | 1.63 |

TABLE 12C

Testing of mixture on Monsanto MDR 2000 at a test temperature of 170° C., test time: 30 min

| | Example | | | | | | | | |
|---|---|---|---|---|---|---|---|---|---|
| | 20* | 21* | 22* | 23* | 24* | 25* | 26 | 27 | 28 |
| Minimum torque, dNm | 0.57 | 0.79 | 0.78 | 0.69 | 0.93 | 0.93 | 0.57 | 0.68 | 0.81 |
| Maximum torque, dNm | 44.5 | 23.8 | 26.4 | 47.3 | 26.5 | 29.6 | 33 | 39 | 41.4 |
| TS2 rise time, min | 0.7 | 0.3 | 0.27 | 0.67 | 0.28 | 0.26 | 0.39 | 0.35 | 0.34 |
| 50% conversion time, min | 2.33 | 0.43 | 0.39 | 2.25 | 0.41 | 0.38 | 0.94 | 0.96 | 0.75 |

Tables 13: Tests on Vulcanizates Composed of Mixtures 20-28

TABLE 13A

Tensile test: Test on S2 specimen at RT to DIN 53504 and measurement of hardness at RT to DIN 53505

| | | Example | | | | | | | | |
|---|---|---|---|---|---|---|---|---|---|---|
| | | 20* | 21* | 22* | 23* | 24* | 25* | 26 | 27 | 28 |
| TS | MPa | 13.6 | 16.2 | 12.1 | 12.8 | 16.6 | 14.9 | 13.8 | 14.4 | 14.6 |
| EB | % | 69 | 153 | 103 | 64 | 136 | 113 | 96 | 87 | 82 |
| M100 | MPa | | 10.5 | 11.8 | | 12.1 | 13 | | | |
| Hardness | Shore A | 85 | 76 | 78 | 84 | 76 | 78 | 79 | 83 | 82 |

TABLE 13B

Measurement of compression set (also abbreviated to C.S.) to DIN 53517A at 150° C., 168 h and 25% deformation

| | | Example | | | | | | | | |
|---|---|---|---|---|---|---|---|---|---|---|
| | | 20* | 21* | 22* | 23* | 24* | 25* | 26 | 27 | 28 |
| C.S. | % | 32.6 | 29.5 | 33.1 | 31 | 28 | 30.9 | | 33.2 | 31 |

TABLE 13C

Tensile test on S2 specimen at RT to DIN 53504 and hardness at RT to DIN 53505, using specimens which had been stored at 150° C. in hot air for 7 days.

| | | Example | | | | | | | | |
|---|---|---|---|---|---|---|---|---|---|---|
| | | 20* | 21* | 22* | 23* | 24* | 25* | 26 | 27 | 28 |
| TS | MPa | 18 | 16.5 | 17.3 | 17.9 | 17.2 | 17.7 | | 18.1 | 17.5 |
| EB | % | 90 | 173 | 152 | 87 | 156 | 140 | | 109 | 96 |
| M100 | MPa | | 11.4 | 12.9 | | 12.3 | 13.9 | | 16.8 | |
| Hardness | Shore A | 88 | 81 | 83 | 87 | 80 | 82 | | 88 | 85 |

TABLE 13D

Tensile test on S2 specimen at RT to DIN 53504 and hardness at RT to DIN 53505, using specimens which had been stored at 150° C. in Shell Helix 5W40 engine oil for 7 days.

| | | Example | | | | | | | | |
|---|---|---|---|---|---|---|---|---|---|---|
| | | 20* | 21* | 22* | 23* | 24* | 25* | 26 | 27 | 28 |
| TS | MPa | 16.5 | 16.5 | 14.6 | 14 | 14.3 | 14.1 | | 14.8 | 15.3 |
| EB | % | 76 | 135 | 106 | 69 | 109 | 99 | | 80 | 78 |
| M100 | MPa | | 12.4 | 13.5 | | 13 | 14.3 | | | |
| Hardness | Shore A | 82 | 73 | 75 | 77 | 67 | 70 | | 79 | 75 |
| Volume change (prior to and after storage in engine oil) % | | 5.82 | 6.82 | 6.16 | 14.3 | 16.7 | 15.5 | | 5.74 | 14.1 |

Comparison of the mixtures without * indication based on EVM rubber with the examples with * indication again shows marked advantages in the combination of rapid crosslinking (small TS2 values and 50% conversion times—corresponding to short demoulding/cycle times in a 2c process) with low compression set values and high crosslinking densities (hardness).

Examples 29-33

Mixtures 29-33 with the constitution stated in Table 14 were prepared by the stated procedure.

The mixtures indicated by * are examples which in combination with a thermoplastic component would lead to comparative examples for the purposes of this application, and the mixtures with no indication have constitutions which on combination with a thermoplastic component would lead to inventive examples for the purposes of this application.

TABLE 14

Constitution of mixtures 29-33

| | Example | | | | |
|---|---|---|---|---|---|
| | 29* | 30* | 31* | 32 | 33 |
| Buna ® EPG 5450 | 100 | 100 | 100 | 100 | — |
| Buna ® EPT 2450 | — | — | — | — | 100 |
| Corax ® N 550 | 30 | 30 | 30 | 30 | 20 |
| Thermax ® N 990 | 30 | 30 | 30 | 30 | 20 |
| Vulkasil ® A1 | 10 | 10 | 10 | 10 | 10 |
| Rhenofit ® DDA-70 | 1.5 | 1.5 | 1.5 | 1.5 | 1.5 |
| Vulkanox ® ZMB2/C5 | 0.5 | 0.5 | 0.5 | 0.5 | 0.5 |
| Zinkoxyd aktiv | 2 | 2 | 2 | 2 | 2 |
| Maglite ® DE | 2 | 2 | 2 | 2 | 2 |
| DIAK ® No. 7 | 3 | 3 | 3 | 3 | 3 |
| PERKADOX ® 14-40 B-PD | 12 | — | — | 8 | 6 |
| Trigonox ® 29 | — | 12 | 16 | 8 | 6 |
| Total phr | 191 | 191 | 195 | 195 | 171 |

Tables 15: Tests on Mixtures 29-33

The Mooney viscosity (ML 1+4@100° C.) stated in Table 15A was determined to DIN D 1646.

TABLE 15A

| | Example | | | | |
|---|---|---|---|---|---|
| | 29* | 30* | 31* | 32 | 33 |
| ML 1 + 4 @ 100° C. | 108 | 115 | 113 | 111 | 53 |

TABLE 15B

Testing of mixture on Monsanto MDR 2000 at a test temperature of 160° C., test time: 30 min

| | Example | | | | |
|---|---|---|---|---|---|
| | 29* | 30* | 31* | 32 | 33 |
| Minimum torque, dNm | 2.97 | 3.77 | 3.81 | 3.56 | 1.21 |
| Maximum torque, dNm | 72.8 | 43.1 | 50.5 | 73.3 | 46.8 |
| TS2 rise time, min | 0.84 | 0.37 | 0.34 | 0.41 | 0.57 |
| 50% conversion time, min | 9.38 | 0.93 | 0.84 | 3.35 | 3.41 |

TABLE 15C

Testing of mixture on Monsanto MDR 2000 at a test temperature of 170° C., test time: 30 min

| | Example | | | | |
|---|---|---|---|---|---|
| | 29* | 30* | 31* | 32 | 33 |
| Minimum torque, dNm | 2.81 | 3.72 | 3.77 | 3.49 | 1.15 |
| Maximum torque, dNm | 72.2 | 40.1 | 46.6 | 70 | 50.3 |
| TS2 rise time, min | 0.51 | 0.28 | 0.26 | 0.3 | 0.39 |
| 50% conversion time, min | 3.48 | 0.51 | 0.48 | 1.34 | 1.77 |

Tables 16: Tests on Vulcanizates Composed of Mixtures 29-33

TABLE 16A

Tensile test: Test on S2 specimen at RT to DIN 53504 and measurement of hardness at RT to DIN 53505

| | | Example | | | | |
|---|---|---|---|---|---|---|
| | | 29* | 30* | 31* | 32 | 33 |
| TS | MPa | 11.6 | 13.9 | 12.3 | 10.2 | 9.3 |
| EB | % | 70 | 159 | 123 | 67 | 105 |
| M100 | MPa | | 7 | 9.1 | | 8.6 |
| Hardness | Shore A | 84 | 77 | 80 | 84 | 79 |

TABLE 16B

Measurement of compression set (C.S.) to DIN 53517A at 150° C., 168 h and 25% deformation

| | | Example | | | |
|---|---|---|---|---|---|
| | | 29* | 30* | 31* | 32 |
| C.S. | % | 22.2 | 29 | 27.1 | 26 |

TABLE 16C

Tensile test on S2 specimen at RT to DIN 53504 and hardness at RT to DIN 53505, using specimens which had been stored at 150° C. in hot air for 7 days.

| | | Example | | | |
|---|---|---|---|---|---|
| | | 29* | 30* | 31* | 32 |
| TS | MPa | 12.5 | 16.3 | 16.1 | 12 |
| EB | % | 67 | 171 | 143 | 70 |
| M100 | MPa | | 7.9 | 9.9 | |
| Hardness | Shore A | 85 | 78 | 81 | 86 |

TABLE 16D

Tensile test on S2 specimen at RT to DIN 53504 and hardness at RT to DIN 53505, using specimens which had been stored at 150° C. in Shell Helix 5W40 engine oil for 7 days.

| | | Example | | | | |
|---|---|---|---|---|---|---|
| | | 29* | 30* | 31* | 32 | 33 |
| TS | MPa | 5 | 4.4 | 7.1 | 5 | 14.3 |
| EB | % | 35 | 56 | 70 | 36 | 109 |
| M100 | MPa | | | | | 13 |
| Hardness | Shore A | 76 | 61 | 66 | 75 | 67 |
| Volume change (prior to and after storage in engine oil) % | | 58.2 | 46.2 | 76.3 | 66.3 | 47.2 |

Comparison of the mixtures without * indication based on EPDM rubber with the examples with * indication again shows marked advantages in the combination of rapid crosslinking (small TS2 values and 50% conversion times—corresponding to short demoulding/cycle times in a 2c process) with low compression set values and high crosslinking densities (hardness).

Tables 17: Vulcanizate Tests on Conditioned Mixtures 29-33

TABLE 17A

Mouldings for production of test sheets of thickness 2 or 6 mm and dimensions 100 mm by 100 mm are heated and pressed between 1 mm Teflon film in a preheated platen press, and then removed and then conditioned at atmospheric pressure in a conditioning oven (hot air) for 20 min at 160° C. and 20 min at 170° C.

|  | Example | | | |
|---|---|---|---|---|
|  | 29* | 30* | 31* | 32 |
| Heating time for 2 mm sheet, sec | 40 | 30 | 30 | 30 |
| Heating time for 6 mm sheet/sec | 70 | 60 | 60 | 60 |

TABLE 17B

Tensile test on S2 specimen at RT to DIN 53504 and hardness at RT to DIN 53505, using specimens

|  |  | Example | | | |
|---|---|---|---|---|---|
|  |  | 29* | 30* | 31* | 32 |
| TS | MPa | 6.7 | 14.4 | 14.7 | 7.8 |
| EB | % | 61 | 181 | 159 | 66 |
| M100 | MPa |  | 5.9 | 7.3 |  |
| Hardness | Shore A | 78 | 75 | 77 | 83 |

TABLE 17C

Tensile test on S2 specimen at RT to DIN 53504 and hardness at RT to DIN 53505, using specimens which had been stored at 150° C. in Shell Helix 5W40 engine oil for 7 days.

|  |  | Example | | | |
|---|---|---|---|---|---|
|  |  | 29* | 30* | 31* | 32 |
| TS | MPa | 1.6 | 5.5 | 6.3 | 4.7 |
| EB | % | 19 | 74 | 71 | 40 |
| M100 | MPa |  |  |  |  |
| Hardness | Shore A | 64 | 58 | 62 | 68 |
| Volume change (prior to and after storage in engine oil) % | | 72.7 | 89.2 | 77.7 | 62.8 |

The experiment to simulate vulcanization behaviour in a 2c mould system by means of brief surface heating in a press combined with a downstream conditioning process at atmospheric pressure shows that this process, too, gives mouldings with properties comparable to those from traditional vulcanization under pressure, cf. Table 17.

Example 34-37

Mixtures 34-37 with the constitution stated in Table 14 were prepared by the stated procedure.

The mixtures indicated by * are examples which in combination with a thermoplastic component would lead to comparative examples for the purposes of this application, and the mixtures with no indication have constitutions which on combination with a thermoplastic component would lead to inventive examples for the purposes of this application.

TABLE 18

Constitution of mixtures 34-37

|  | Example | | | |
|---|---|---|---|---|
|  | 34* | 35* | 36* | 37 |
| VAMAC ® D | 100 | 100 | 100 | 100 |
| Corax ® N 550 | 30 | 30 | 30 | 30 |
| Thermax ® N 990 | 30 | 30 | 30 | 30 |
| Rhenofit ® OCD | 1 | 1 | 1 | 1 |
| Armeen ® 18 D Prills | 1 | 1 | 1 | 1 |
| DIAK ® No. 7 | 3 | 3 | 3 | 3 |
| PERKADOX ® 14-40 B-PD | 12 |  |  | 8 |
| Trigonox ® 29 |  | 12 | 16 | 8 |
| Total phr | 177 | 177 | 181 | 181 |

Tables 19: Testing on Mixtures 34-37

The Mooney viscosity (ML 1+4@100° C.) stated in Table 19 A was determined to DIN D 1646.

TABLE 19A

Mooney viscosity

|  | Example | | | |
|---|---|---|---|---|
|  | 34* | 35* | 36* | 37 |
| ML 1 + 4/ME | 25 | 25 | 24 | 22 |

Testing of Vulcanization Behaviour

TABLE 19B

Testing of mixture on Monsanto MDR 2000 at a test temperature of 160° C., test time: 30 min

|  | Example | | | |
|---|---|---|---|---|
|  | 34* | 35* | 36* | 37 |
| Minimum torque, dNm | 0.36 | 0.42 | 0.42 | 0.38 |
| Maximum torque, dNm | 26.9 | 6.17 | 8.88 | 22.5 |
| TS2 rise time, min | 3.27 | 0.99 | 0.74 | 1.31 |
| 50% conversion time, min | 11 | 1.33 | 1.24 | 8 |

TABLE 19C

Testing of mixture on Monsanto MDR 2000 at a test temperature of 170° C., test time: 30 min

|  | Example | | | |
|---|---|---|---|---|
|  | 34* | 35* | 36* | 37 |
| Minimum torque, dNm | 0.35 | 0.41 | 0.41 | 0.35 |
| Maximum torque, dNm | 26.8 | 5.51 | 7.99 | 22 |
| TS2 rise time, min | 1.56 | 0.58 | 0.45 | 0.7 |
| 50% conversion time, min | 4.64 | 0.68 | 0.61 | 3.45 |

Tables 20: Tests on Vulcanizates Composed of Mixtures 34-37

TABLE 20A

Tensile test on S2 specimen at 20° C. to DIN 53504 and hardness at 20° C. to DIN 53505

| | | Example | | | |
|---|---|---|---|---|---|
| | | 34* | 35* | 36* | 37 |
| TS | MPa | 11.9 | 10.2 | 11.1 | 11.5 |
| EB | % | 84 | 284 | 229 | 97 |
| M100 | MPa | | 3 | 4.1 | 12.5 |
| Hardness | Shore A | 75 | 54 | 58 | 72 |

TABLE 20B

Measurement of compression set (C.S.) to DIN 53517A at 150° C., 168 h and 25% deformation

| | | Example | | | |
|---|---|---|---|---|---|
| | | 34* | 35* | 36* | 37 |
| C.S. | % | 31.8 | 38.7 | 37 | 35.2 |

TABLE 20C

Tensile test on S2 specimen at RT to DIN 53504 and hardness at RT to DIN 53505, using specimens which had been stored at 150° C. in hot air for 7 days.

| | | Example | | | |
|---|---|---|---|---|---|
| | | 34* | 35* | 36* | 37 |
| TS | MPa | 16.5 | 11.1 | 12.8 | 15.9 |
| EB | % | 109 | 343 | 255 | 125 |
| M100 | MPa | 15 | 3.3 | 4.8 | 12.4 |
| Hardness | Shore A | 79 | 63 | 66 | 77 |

TABLE 20D

Tensile test on S2 specimen at RT to DIN 53504 and hardness at RT to DIN 53505, using specimens which had been stored at 150° C. in Shell Helix 5W40 engine oil for 7 days.

| | | Example | | | |
|---|---|---|---|---|---|
| | | 34* | 35* | 36* | 37 |
| TS | MPa | 12.5 | 11.5 | 11.4 | 11.7 |
| EB | % | 88 | 227 | 166 | 92 |
| M100 | MPa | | 4.1 | 5.7 | |
| Hardness | Shore A | 71 | 57 | 61 | 70 |
| Volume change (prior to and after storage in engine oil) % | | 7.5 | 7.9 | 7.2 | 7.0 |

Comparison of the mixtures without * indication based on EAM rubber with the examples with * indication again shows marked advantages in the combination of rapid crosslinking (small TS2 values and 50% conversion times—corresponding to short demoulding/cycle times in a 2c process) with low compression set values and high crosslinking densities (see high hardness values).

Production of Rubber-Thermoplastics Composite Articles

The elastomer component used was that of Example 6 based on HNBR. The thermoplastic component used comprised the following materials:

1. Durethan® BKV 30: PA 6, 30% glass fibre reinforced; commercially available product from Lanxess Deutschland GmbH
2. Durethan® BKV 35H2.0: PA 6, injection moulding grade, 35% glass fibres, heat-resistant; commercially available product from Lanxess Deutschland GmbH
3. Durethan®9 BKV 50H1.0: PA 6, injection moulding grade, 50% glass fibres, heat-resistant; commercially available product from Lanxess Deutschland GmbH
4. Durethan® BKV 50H2.0: PA 6, injection moulding grade, 50% glass fibres, heat-resistant; commercially available product from Lanxess Deutschland GmbH
5. Durethan® BKV 60H2.0: PA 6, injection moulding grade, 60% glass fibres, low-viscosity, free-flowing (Easy Flow); commercially available product from Lanxess Deutschland GmbH
6. Durethan® AKV 30H2.0: PA 66, injection moulding grade, 30% glass fibres, heat- and hydrolysis-resistant; commercially available product from Lanxess Deutschland GmbH
7. Durethan® AKV 30 H1.0: PA 66, injection moulding grade, 30% glass fibres, heat-resistant; commercially available product from Lanxess Deutschland GmbH
8. Durethan®9 AKV 35 HR H2.0: PA 66, injection moulding grade, 35% glass fibres, heat- and hydrolysis-resistant; commercially available product from Lanxess Deutschland GmbH
9. Durethan® AKV 50H1.0: PA 66, injection moulding grade, 50% glass fibres, heat-resistant; commercially available product from Lanxess Deutschland GmbH
10. Durethan® AKV 50H2.0: PA 66, injection moulding grade, 50% glass fibres, heat-resistant; commercially available product from Lanxess Deutschland GmbH
11. PA 6, solution viscosity in m-Cresol 3.0, 30% glass fibres, heat-resistant, (JADE 4706-A)
12. Copolyamide composed of PA 6 with 5% of PA66 content, viscosity in m-Cresol 3.0, 30% glass fibres, heat-resistant (JADE 4706-B)
13. PA 66, viscosity in m-Cresol 3.0, 30% glass fibres, heat-resistant (JADE 4706-C)

I Example 1 of Production of Thermoplastics-Rubber Composite Mouldings

The abovementioned polyamides 1-13 as thermoplastic component and in each case the mixture of abovementioned Example 6 as rubber component were used in an experimental mould system in a multicomponent injection moulding process by means of the turntable technique to produce thermoplastics-rubber composite mouldings. For this, the preform was first manufactured from the thermoplastic moulding composition. The thermoplastic was injected at a cylinder temperature of 280° C. at specific injection pressures in the preferred region of 600 bar. The mould system then opened, and the movable mould system half in which the preform remained was rotated by 180° and again closed. The location of the preform was now in the geometrically altered rubber cavity, and was complemented with the rubber component by the injection moulding process. The specific injection pressure for the rubber component was in the preferred region of 1500 bar, using a preferred temperature of the composition of 95° C. After the mould had been filled, the rubber was crosslinked to achieve dimensional stability using a mould system temperature of 190° C. and was demoulded after a heating time of 45 sec. In parallel with the injection procedure for the rubber component, a further thermoplastic preform was already being manufactured. Vulcanization to set the desired property profile was completed in the downstream conditioning process. This conditioning was carried out either for 120 minutes at 170° C. (variant a) or for 60 minutes at 180° C. (variant b).

FIG. 1 shows a sketch of the thermoplastics-rubber composite moulding

Testing of the Thermoplastics-Rubber Composite Mouldings from Example I

Testing of the adhesion between thermoplastic and vulcanized rubber was carried out by means of tensile tests. For this, the test specimens were clamped into a tensile machine and tested until the composite failed. It was found that the products based on JADE 4706-A, JADE 4706-B and JADE 4706-C which involve modifications of commercially available products, exhibited higher adhesions than the associated commercially available products. The adhesion studies likewise showed that conditioning by the abovementioned variant a) leads to higher adhesions than conditioning by the abovementioned variant b). The conditioning time needed decreases when the test specimens or components are introduced into the conditioning process continuously and directly after removal from the injection moulding machine. It has been found that a time-differentiated temperature rise in the conditioning process, (a graduated temperature rise) leads to further optimization in the decomposition kinetics of the peroxides and improves the properties of the components. Processability was checked in light of these fundamental adhesion studies on the composite.

II Example 2 of Production of Thermoplastics-Rubber Composite Mouldings

The abovementioned polyamides 1-13 as thermoplastic component and in each case the mixture of abovementioned Example 6 as rubber component were used in an experimental mould system in a multicomponent injection moulding process by means of the turntable technique to produce thermoplastics-rubber composite mouldings. For this, the preform was first manufactured from the thermoplastic moulding composition. The thermoplastic was injected at specific injection pressures at 1000 bar, the temperature of the composition being about 290° C. The mould system then opened, and the movable mould system half in which the preform remained was rotated by 180° and again closed. The location of the preform was now in the geometrically altered rubber cavity, and was complemented with the rubber component by the injection moulding process. The specific injection pressure for the rubber component was 1400 bar, using a temperature of the composition of 95° C. After the mould had been filled, the rubber was crosslinked to achieve dimensional stability using a mould system temperature of 175° C. and was demoulded after a heating time of 80 sec. In parallel with the injection procedure for the rubber component, a further thermoplastic preform was already being manufactured. Vulcanization to set the desired property profile was completed at a preferred temperature of 175° C. and with a conditioning time of 30 minutes in the downstream conditioning process. FIG. 2 shows a sketch of the thermoplastics-rubber composite moulding, which represents a fluids container with directly moulded-on elastomeric gasket.

Testing of Leakproof Properties on the Thermoplastics-Rubber Composite Mouldings of Example II For this, tests of leakproof properties were carried out firstly at room temperature and secondly with exposure to temperature variation.

The component test at room temperature (RT) used to study leakproof properties is a test method in which the component is exposed to a rising internal pressure until a pressure drop (or no further increase) occurs due to inadequate leakproof properties. For this, the fluids-container lids with injected gasket were screw-fastened to an aluminium plate, using a torque wrench. The tightening torque set was 8 Nm. With this torque, it is likely that the gasket has undergone maximum deformation. Washers (M6×18) were used to enlarge the area under pressure from the head of the screw system. The size of the washer is one of the factors determining leakproof properties. The aluminium plate has a hole permitting use of a fluid to exert pressure on the component to be tested. For this, a quick connector was used to attach, to the aluminium plate, a hose through which the fluid exerting pressure was passed into the component.

The pressure is generated by way of a compressor and is adjustable by way of the controlled unit of the test system. A Kistler pressure sensor conveyed the actual prevailing pressure in the system to a display and transmitted the pressure curve to an EDP system. This shows when the component begins to leak. The highest pressure achieved is saved in the memory of the test system. When the inventive fluids-container lids were used the pressures achieved prior to leakage were about 22 bar.

The second study of leakproof properties took place with exposure to temperature variation up to 150° C. In this test, the fluids containers had been screw-fastened to an aluminium plate in a manner similar to that for the test of leakproof properties at RT.

A fluid was passed through the experimental mouldings. A test fluid (e.g. water, glycol or oil) was passed under a desired pressure through the test specimens. In each case, the pressure could be read off by way of a manometer at the inlet and outlet. The temperature of the fluid was controlled by way of a thermostat. Once the desired pressure and the temperature had been set, the experiment was carried out for a period of 1000 hours. The fluid temperature here was tested at from 25° C. to 150° C. at a pressure of 2.5 bar at the inlet and 2 bar at the outlet. The test fluid used was engine oil. This oil is the product SAE 0W-40, which is a fully synthetic engine oil, the producer being Mobil 1. The flow rate was 8 µl/min.

Degradation of polymers or of polymeric networks takes place via energy input. This long-term test is a type of artificial ageing (chemical and physical processes proceeding over the course of time within the material) and is intended to simulate the ageing processes proceeding during practical use of polymeric materials, via use of accelerated conditions.

The inventive thermoplastics-rubber composite mouldings were leakproof over the entire time of the experiment.

The invention claimed is:

1. A multicomponent system comprising
   1) a thermoplastic component and
   2) a rubber component comprising
      a) one or more elastomers,
         wherein 30% by weight or more of the elastomers present in the rubber component, based on 100% by weight as the entirety of all of the elastomers of the rubber component, are peroxidically vulcanizable, and
      b) two or more peroxidic crosslinking agents, wherein at least one peroxidic crosslinking agent has a decomposition temperature $T_{1/2}$ (1 h) in the range from 70 to 130° C. and at least one second peroxidic crosslinking agent has a decomposition temperature $T_{1/2}$ (1 h) in the range from 120 to 160° C. is used, wherein at least two peroxidic crosslinking agents are present with a difference in decomposition temperature $T_{1/2}$ (1 h) of at least 5° C.

2. A multicomponent system according to claim 1, wherein the thermoplastic component 1) comprises one or more thermoplastics.

3. A multicomponent system according to claim 2, wherein the thermoplastic component 1) comprises one or more polyamides having a softening point greater than or equal to 200° C.

4. A multicomponent system according to claim 1, wherein the rubber component 2) comprises one or more elastomers selected from the group consisting of nitrile rubbers, hydrogenated nitrile rubbers, ethylene-vinyl acetate copolymers, ethylene propylene diene monomer rubber, ethylene acrylic rubber, alkyl acrylate copolymers, fluororubbers, chloroprene rubbers and chlorinated polyethylene.

5. A multicomponent system according to claim 1, wherein the rubber component 2) of the multicomponent system comprises one or more elastomers and two or more peroxidic crosslinking agents, where at least one peroxidic crosslinking agent having a decomposition temperature $T_{1/2}$ (1 h) in the range from 100 to 125° C. and at least one second peroxidic crosslinking agent having a decomposition temperature $T_{1/2}$ (1 h) in the range from 130 to 150° C. is used, wherein at least two peroxides are present with a difference in decomposition temperature $T_{1/2}$ (1 h) of at least 5° C.

6. A multicomponent system according to claim 1, wherein the peroxidic crosslinking agent having a decomposition temperature $T_{1/2}$ (1 h) in the range from 70 to 130° C. is selected from the group consisting of bis(2,4-dichlorobenzoyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(t-butylperoxy)butene and 4,4-di-tert-butylperoxy-substituted nonyl valerate.

7. A multicomponent system according to claims 1, wherein the peroxidic crosslinking agent having a decomposition temperature $T_{1/2}$ (1 h) in the range from 120 to 160° C. is selected from the group consisting of tert-butyl perbenzoate, 2,2-bis(tert-butylperoxy)butene, 4,4-di-tert-butylperoxy-substituted nonyl valerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide and 2,5-dimethyl-2,5-di(tert-butylperoxy)hex-3-yne.

8. A multicomponent system according to claim 1, wherein the peroxidic crosslinking agent comprises the combination of 1,3-bis(tert-butylperoxyisopropyl)benzene and 1,1-bis(tert-butylperoxy)-3,3,5-trimethylcyclohexane, or tert-butyl perbenzoate and di-tert-butyl peroxide, or 1,3-bis(tert-butylperoxyisopropyl)benzene and di-tert-butyl peroxide or tert-butyl perbenzoate and tert-butyl cumyl peroxide.

9. A multicomponent system according to claim 1, comprising
1) a thermoplastic component comprising one or more polyamides and/or one or more polyimides, and/or one or more polyethers and/or one or more polyesters and/or one or more polyphenyl sulphide and/or one or more polycarbonates, wherein the thermoplastic has a softening point greater than or equal to 180° C., and also
2) a rubber component comprising
 a) one or more peroxidically crosslinkable hydrogenated nitrile rubbers and/or one or more peroxidically crosslinkable vinyl acetate-ethylene copolymers and/or one or more peroxidically crosslinkable acrylate-ethylene copolymers and/or one or more peroxidically crosslinkable acrylate (co)polymers and/or one or more peroxidically crosslinkable nitrile rubbers and/or one or more peroxidically crosslinkable chloroprene rubbers and/or one or more peroxidically crosslinkable fluororubbers and/or peroxidically crosslinkable chlorinated polyethylene and, optionally, further, other elastomers, wherein the abovementioned elastomers of which 30% by weight or more, based on 100% by weight of all of the elastomers in component 2), is peroxidically crosslinkable and
 b) two or more peroxidic crosslinking agents, where at least one peroxidic crosslinking agent having a decomposition temperature $T_{1/2}$ (1 h) in the range from 70 to 130° C. and at least one peroxidic crosslinking agent having a decomposition temperature $T_{1/2}$ (1 h) is in the range from 120 to 160° C., wherein at least two crosslinking agents are present having a difference in decomposition temperature $T_{1/2}$ (1 h) is at least 5° C.

10. A multicomponent system according to claim 1, comprising
1) a thermoplastic component comprising one or more polyamides having a softening point greater than or equal to 180° C. and
2) a rubber component comprising
 a) one or more peroxidically crosslinkable hydrogenated nitrile rubbers and
 b) two or more peroxidic crosslinking agents, where at least one peroxidic crosslinking agent having a decomposition temperature $T_{1/2}$ (1 h) in the range from 70 to 130° C. and at least one peroxidic crosslinking agent having a decomposition temperature $T_{1/2}$ (1 h) is in the range from 120 to 160° C., wherein at least two crosslinking agents are present having a difference in decomposition temperature $T_{1/2}$ (1 h) is at least 5° C.

11. A thermoplastic rubber composite molding comprising a multicomponent system according to claim 1.

12. A molding according to claim 11 in the shape of sealing functional elements, or of components or of component groups in the cooling-circulation or oil-circulation system of automobiles.

13. A molding according to claim 11 for the production of cylinder covers with peripheral gasket, oil sumps with peripheral gasket, toothed-belt covers with peripheral gasket, chain covers with peripheral gasket, engine housings with gaskets, thermostat housings with peripheral gasket, water tanks with gaskets, radiators with gaskets, oil modules with gaskets, air intake nozzles with seals, housing covers with gaskets, valve covers with gaskets, rubber-coated rolls, flanges, pipe couplings and hose couplings, weatherstrips, gaskets, rollers, or of structural components with damping elements.

14. The system according to claim 2 having one or more thermoplastics selected from the group consisting of one or more polyamides, polyimides, polyethers, polyesters, polyphenylene sulphide (PPS) and polycarbonates.

15. The system according to claim 3 comprising one or more polyamides having a softening point greater than or equal to 210° C.

* * * * *